(12) United States Patent
Benard

(10) Patent No.: US 11,155,990 B2
(45) Date of Patent: Oct. 26, 2021

(54) SHELTER CONSTRUCTED FROM INTERCONNECTING PANELS

(71) Applicant: PHS Holdings Ltd., Edmonton (CA)

(72) Inventor: Joshua Benard, Edmonton (CA)

(73) Assignee: PHS Holdings Ltd., Edmonton (CA)

( * ) Notice: Subject to any disclaimer, the term of this patent is extended or adjusted under 35 U.S.C. 154(b) by 0 days.

(21) Appl. No.: 16/965,410

(22) PCT Filed: Jan. 29, 2018

(86) PCT No.: PCT/CA2018/050104
§ 371 (c)(1),
(2) Date: Jul. 28, 2020

(87) PCT Pub. No.: WO2019/144211
PCT Pub. Date: Aug. 1, 2019

(65) Prior Publication Data
US 2021/0054614 A1    Feb. 25, 2021

(51) Int. Cl.
| | | |
|---|---|---|
| *E04B 7/04* | (2006.01) | |
| *E04B 1/343* | (2006.01) | |
| *E04B 1/14* | (2006.01) | |
| *E04B 1/41* | (2006.01) | |
| *E04B 1/61* | (2006.01) | |
| *E04B 5/02* | (2006.01) | |
| *E04B 7/22* | (2006.01) | |
| *E04B 7/24* | (2006.01) | |
| *E04H 1/12* | (2006.01) | |
| *E04B 1/38* | (2006.01) | |

(52) U.S. Cl.
CPC ............ *E04B 1/34321* (2013.01); *E04B 1/14* (2013.01); *E04B 1/40* (2013.01); *E04B 1/6116* (2013.01); *E04B 1/6187* (2013.01); *E04B 5/023* (2013.01); *E04B 7/22* (2013.01); *E04B 7/24* (2013.01); *E04H 1/1205* (2013.01); *E04B 2001/405* (2013.01)

(58) Field of Classification Search
None
See application file for complete search history.

(56) References Cited

U.S. PATENT DOCUMENTS

| | | |
|---|---|---|
| 3,054,481 A | 9/1962 | Johnson et al. |
| 3,296,753 A | 1/1967 | McGee et al. |
| 3,543,456 A | 12/1970 | Gregoire |

(Continued)

FOREIGN PATENT DOCUMENTS

WO    2015120502 A1    8/2015

OTHER PUBLICATIONS

Fitz-Hardy, Christopher; International Search Report and Written Opinion of the International Searching Authority, issued in International Application No. PCT/CA2018/050104; dated Oct. 1, 2018; 8 pages.

*Primary Examiner* — Basil S Katcheves

(74) *Attorney, Agent, or Firm* — Ulmer & Berne LLP

(57) ABSTRACT

A shelter includes a floor portion, at least one wall portion having a top wall portion, a bottom wall portion, or both, and a roof portion. Each portion includes at least two panels which are detachably interconnected using female and male bracket elements configured for receiving the panels and including cooperating means actuated by longitudinal movement for preventing separation of the female and male bracket elements and interconnecting the panels.

19 Claims, 23 Drawing Sheets

(56) References Cited

U.S. PATENT DOCUMENTS

| | | | |
|---|---|---|---|
| 4,102,105 | A | 7/1978 | Taylor et al. |
| 4,642,963 | A | 2/1987 | Borges |
| 5,279,088 | A | 1/1994 | Heydon |
| 6,668,514 | B2 | 12/2003 | Skov |
| 6,968,661 | B2 * | 11/2005 | Kopish ................. E04B 2/7457 52/481.1 |
| 7,028,440 | B2 | 4/2006 | Brisson |
| 7,395,634 | B2 | 7/2008 | Anderson et al. |
| 7,509,776 | B2 | 3/2009 | Reisman |
| 8,056,573 | B2 | 11/2011 | Panigot |
| 8,381,454 | B1 | 2/2013 | Robinson |
| 8,397,461 | B2 | 3/2013 | Browning et al. |
| 9,016,003 | B2 | 4/2015 | Thuma et al. |
| 9,206,595 | B2 | 12/2015 | Rutledge |
| 9,366,030 | B2 | 6/2016 | Spear |
| 2001/0022058 | A1 * | 9/2001 | Conterno ................. E04C 2/543 52/489.1 |
| 2005/0120641 | A1 * | 6/2005 | Whitehead .......... E04B 1/34321 52/79.1 |
| 2005/0223653 | A1 * | 10/2005 | Mower ................... E04D 3/357 52/79.1 |
| 2007/0044391 | A1 * | 3/2007 | Richardson ......... E04B 1/34321 52/79.1 |
| 2007/0283630 | A1 * | 12/2007 | Kasdorf ................ E04B 2/7845 52/36.1 |
| 2008/0134610 | A1 * | 6/2008 | Jakob-Bamberg .... E04B 2/7818 52/489.1 |
| 2009/0165401 | A1 | 7/2009 | Smalley, III |
| 2009/0301021 | A1 | 12/2009 | Jenny |
| 2010/0077683 | A1 | 4/2010 | Lyons et al. |
| 2011/0258943 | A1 | 10/2011 | De Zen et al. |

\* cited by examiner

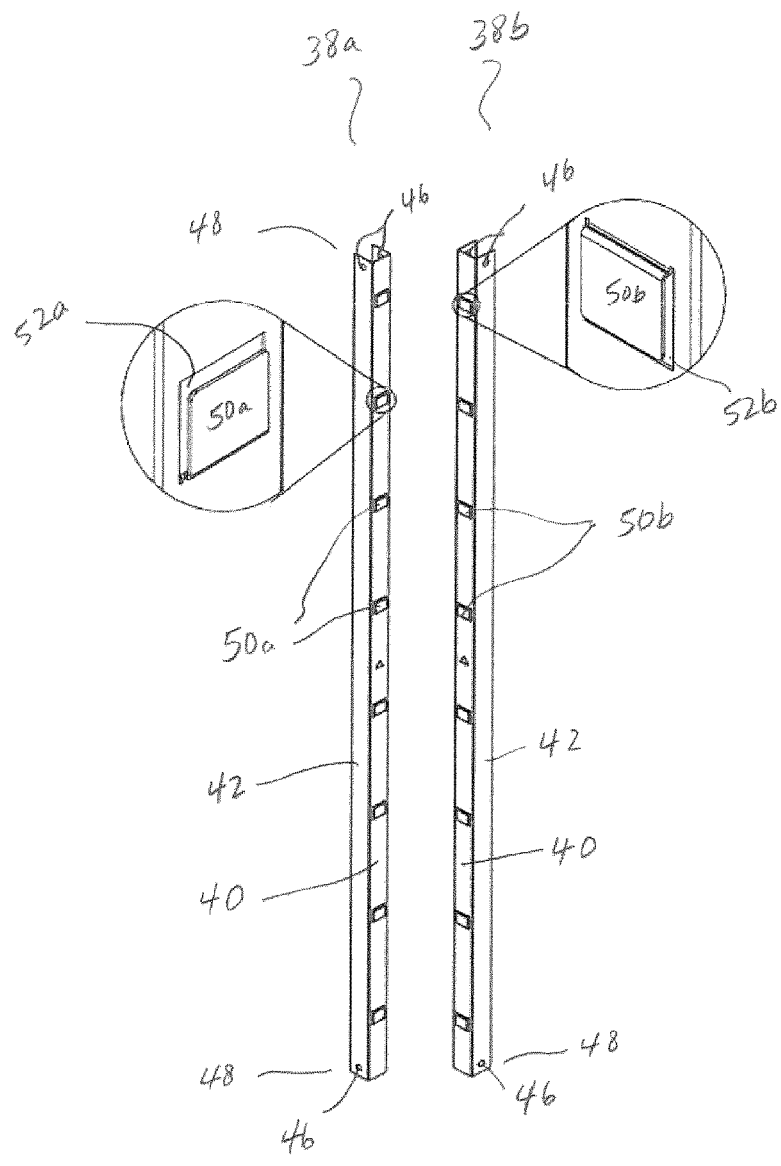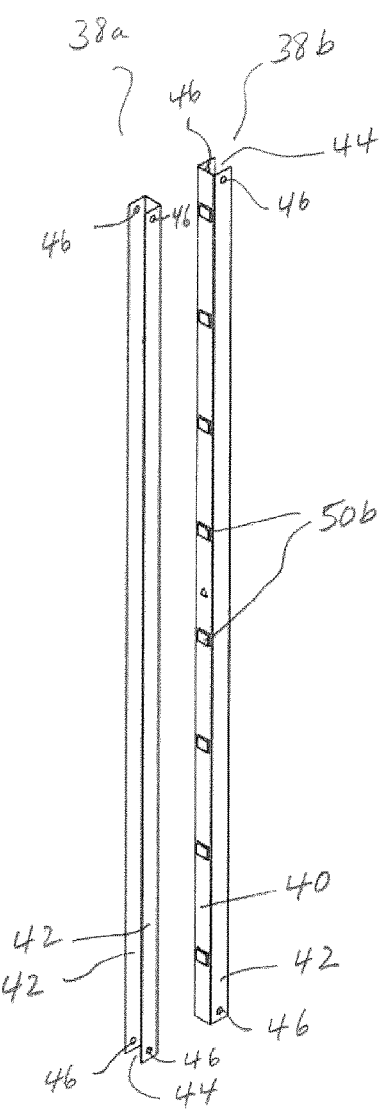
FIG. 5A
FIG. 5B

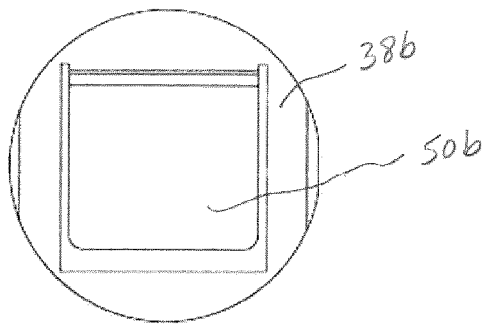 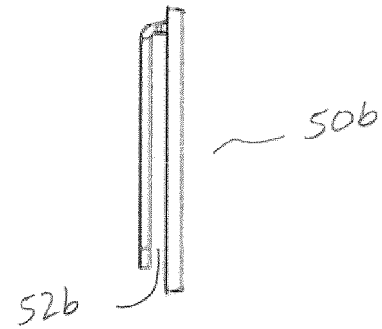
FIG. 6A    FIG. 6B
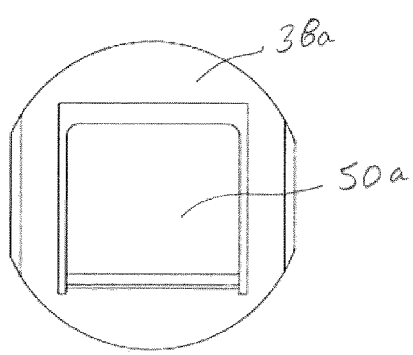 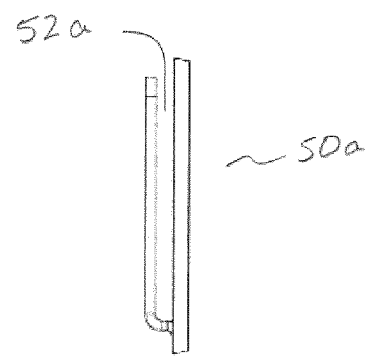
FIG. 6C    FIG. 6D

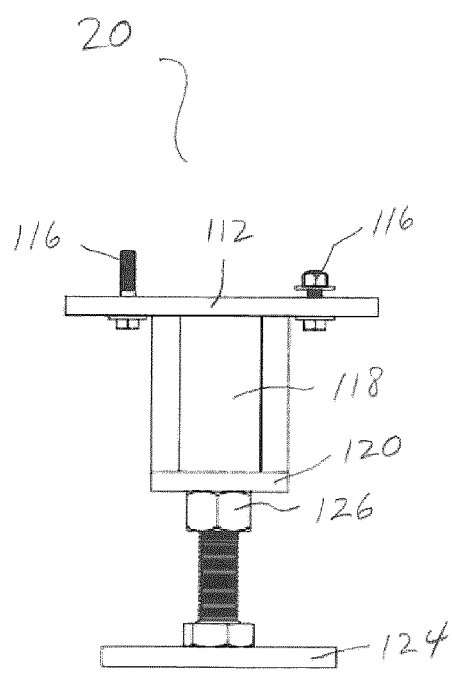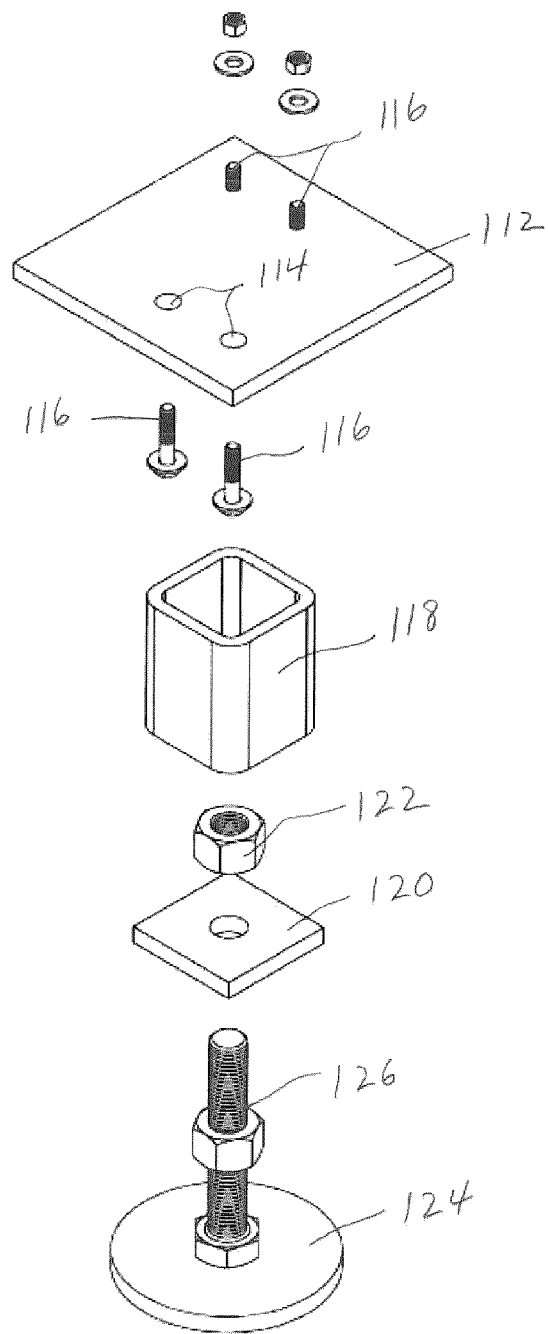
FIG. 15A
FIG. 15B

SHELTER CONSTRUCTED FROM INTERCONNECTING PANELS

FIELD OF THE INVENTION

The present invention is directed to shelters, and more particularly to temporary and permanent shelters constructed from interconnecting structural panels.

BACKGROUND OF THE INVENTION

Shelters are used for various purposes. Temporary shelters may house people in emergency situations such as, for example, armed conflict and natural disasters including earthquakes and flooding. Additionally, shelters may be used in non-emergency situations such as, for example, community developments, and housing homeless populations within the community, and workers and recreational users in remote locations.

Tents are relatively economical, but provide minimal physical protection. Pre-fabricated mobile housing provides greater physical protection, but is relatively expensive and inconvenient to construct and transport.

Modular transportable shelters often fail to maintain a secure shelter because they are not sufficiently sturdy to withstand the elements (e.g., gravity, wind, rain, etc.) post-assembly. Such shelters are likely to collapse without warning, creating a hazard to those within the shelter. Shelters capable of withstanding the elements typically must be constructed by non-specialist personnel, who may have little or no construction experience or access to specialist and/or power tools. Such shelters are typically complex, difficult to assemble, and require proper tools for construction.

While various types of shelters are available as described above, many shelters are heavy and difficult to transport, cannot be readily constructed to ensure rapid availability, and cannot easily be dismantled and re-deployed to another location.

Accordingly, there remains a need in the art for an improved shelter which mitigates these problems.

SUMMARY OF THE INVENTION

The present invention relates to shelters constructed from interconnecting panels.

In one aspect, the invention comprises a shelter comprising:

a floor portion, at least one wall portion comprising a top wall portion, a bottom wall portion, or both, and a roof portion;

wherein each portion comprises at least two panels detachably interconnected using female and male bracket elements configured for receiving the panels and comprising cooperating means actuated by longitudinal movement for preventing separation of the female and male bracket elements and interconnecting the panels.

In one embodiment, each bracket comprises an upper portion and parallel opposed side walls defining a channel for receiving an elongate side edge of the panel therein.

In one embodiment, the cooperating means comprises a plurality of clip members having recessed notches and defined by the upper portion of the bracket. In one embodiment, the clip members of the female bracket comprise upwardly projecting tabs for engaging corresponding notches of the male bracket; and the clip members of the male bracket comprise downwardly projecting tabs for engaging corresponding notches of the female bracket. In one embodiment, the clip members are spaced apart and evenly distributed along the entire length of the bracket or a portion thereof for interconnecting the panels along at least one or more elongate side edges in side-by-side abutment.

In one embodiment, the cooperating means comprises a plurality of pin members positioned to extend outwardly from the upper portion of the male bracket and keyholes defined by the upper portion of the female bracket. In one embodiment, each of the pin members comprises a head and neck. Each keyhole comprises an enlarged portion configured to allow insertion of the head of the pin member therethrough, and an adjacent reduced portion projecting from the bottom of the enlarged portion and configured to allow insertion of the neck to hold the pin member in the keyhole and prevent removal therefrom.

In one embodiment, the cooperating means comprises tabs and corresponding slots, the tabs being formed integral with a side wall of the male bracket and extending from the edge of the side wall beyond the upper portion of the male bracket, and the slots being defined by a longitudinal edge of the upper portion of the female bracket.

In one embodiment, the tabs define notches for engaging the slots.

In one embodiment, the shelter further comprises locking elements and attachment means fastened to one or both ends of the brackets for preventing longitudinal displacement of the male bracket in relation to the female bracket.

In one embodiment, the shelter further comprises planar boards defining bores for receiving fastening means for fastening the planar boards to the locking elements.

In one embodiment, the floor portion comprises a plurality of floor panels, locking elements, corner panels, and trim floor connections for connecting the bottom wall portion to the floor portion. In one embodiment, the trim floor connection comprises a base plate, opposed top and bottom flanges, and edge flanges; one or more of the base plate, top and bottom flanges, and edge flanges defining apertures for receiving attachment means for connecting the trim floor connection to the floor panels.

In one embodiment, the shelter further comprises adjustable support feet for elevating the shelter above ground.

In one embodiment, the bottom wall portion comprises front, rear, and side panels, the front and rear panels being connected to the side panels by corner panels.

In one embodiment, the top wall portion is positioned between the bottom wall portion and the roof portion, and comprises rectangular-shaped panels, corner panels, and gable panels connected by locking elements.

In one embodiment, the roof portion is positioned over the top wall portion to slope downwardly to ground, and comprises roof panels, front trim connections, edge trim connections, and rear trim connections connected by locking elements; the front, edge, and rear trim connections connecting the roof portion to the top wall portion.

In one embodiment, the front trim connection comprises an upper lipped portion, downwardly angled ledge, and lower lipped portion; the upper lipped portion and lower lipped portion defining apertures for receiving attachment means for connecting the front trim connection to the front roof panels.

In one embodiment, the edge trim connection comprises an elongate bracket, a base plate, and a bottom flange; the bracket and base plate defining apertures for receiving attachment means for connecting the first trim connection to the edge roof panels.

In one embodiment, the rear trim connection comprises a first side lipped portion, downwardly angled ledge, flat body portion, and a second side lipped portion, the first side lipped portion and flat body portion defining apertures for receiving attachment means for connecting the rear trim connection to the rear roof panels.

In one embodiment, the shelter further comprises a passageway for allowing access to the shelter or accommodating a door therein. In one embodiment, the shelter further comprises an opening accommodating glazing, screening, or both for allowing passage of light.

Additional aspects and advantages of the present invention will be apparent in view of the description, which follows. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will now be described by way of an exemplary embodiment with reference to the accompanying simplified, diagrammatic, not-to-scale drawings. In the drawings:

FIG. 5A is a perspective view of a first embodiment of a connection assembly, showing partial enlargement views of one embodiment of complementary clips for connection of the connection assembly.

FIG. 5B is a perspective view of the embodiment of the connection assembly shown in FIG. 5A.

FIG. 6A is a front elevation view of one embodiment of a clip used for connection of the connection assembly.

FIG. 6B is a side elevation view of the clip of FIG. 6A.

FIG. 6C is a front elevation view of one embodiment of a clip used for connection of the connection assembly.

FIG. 6D is a side elevation view of the clip of FIG. 6C.

FIG. 15A is a perspective view of one embodiment of a support foot.

FIG. 15B is an exploded perspective view of the support foot of FIG. 15A.

DETAILED DESCRIPTION OF THE PREFERRED EMBODIMENTS

Figure 1A:
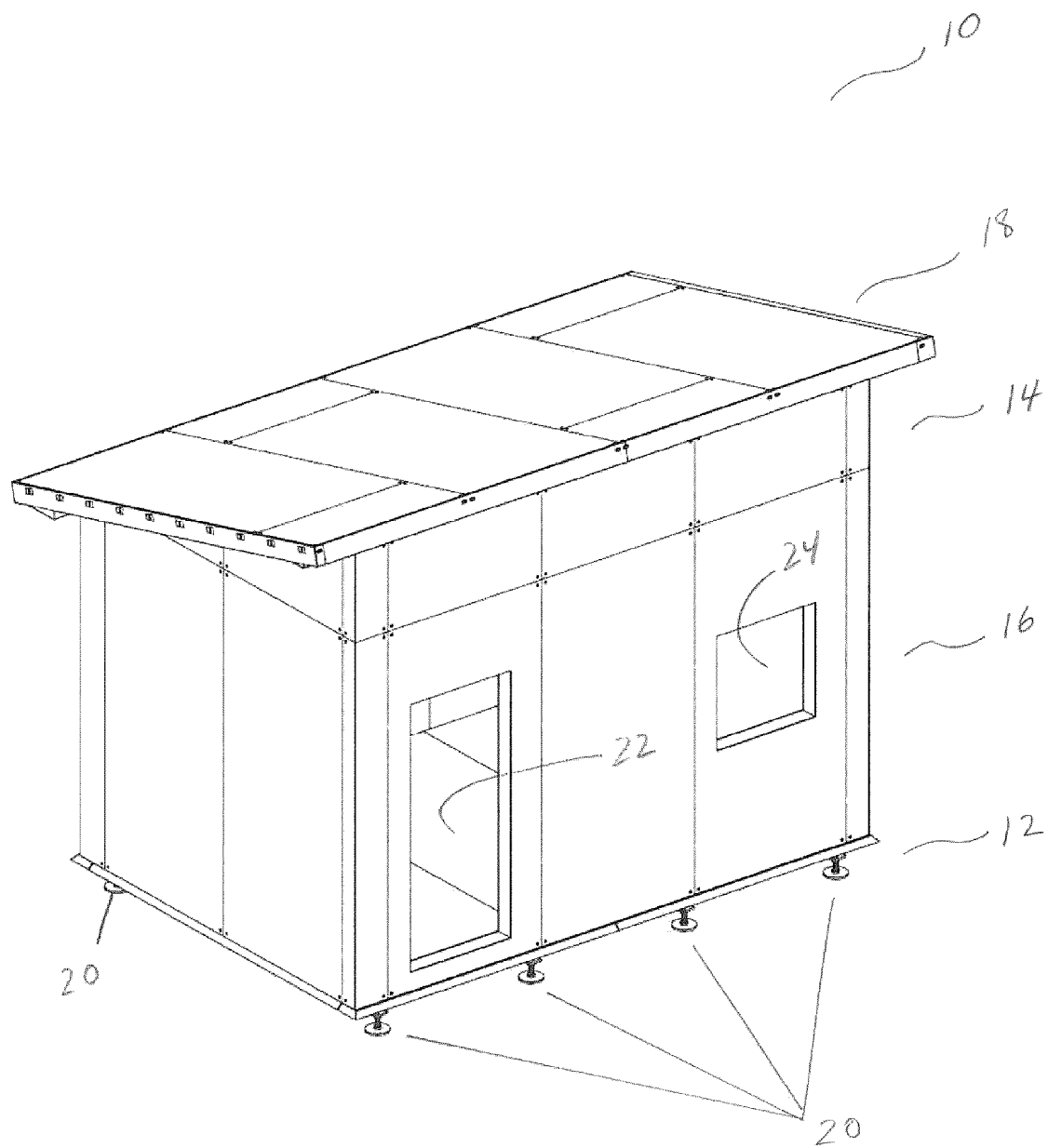
FIG. 1A is a perspective view of one embodiment of a shelter constructed from interlocking panels.
Figure 1B:
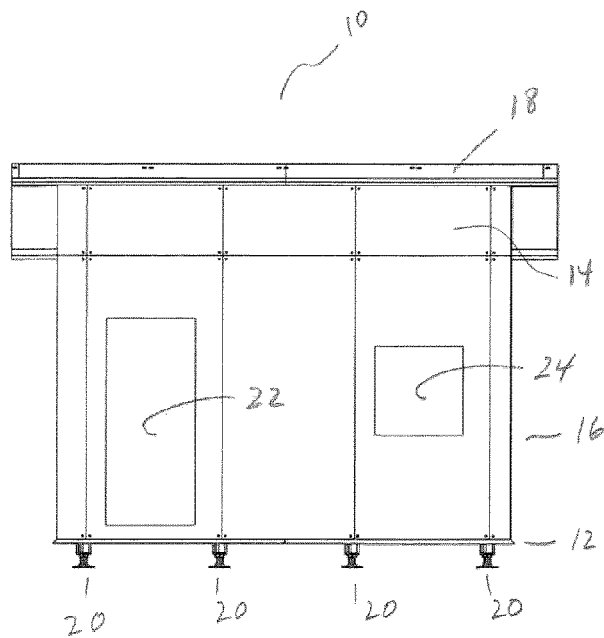
FIG. 1B is a front elevation view of one embodiment of a shelter constructed from interlocking panels.
Figure 1C:
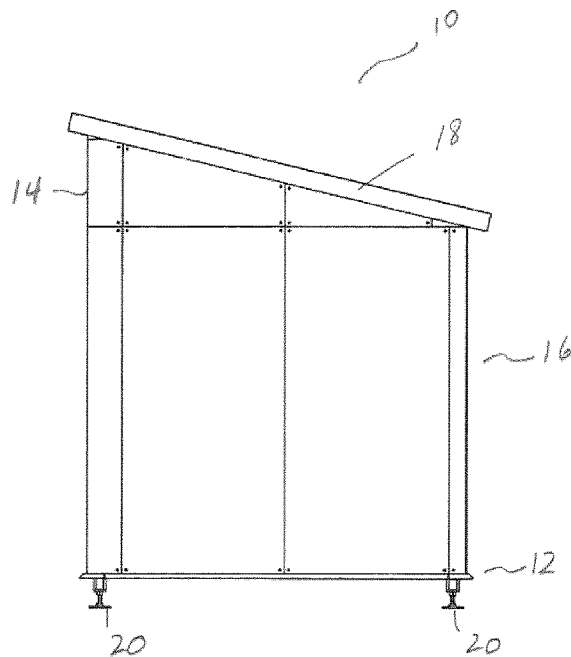
FIG. 1C is a side elevation view of one embodiment of a shelter constructed from interlocking panels
Figure 1D:
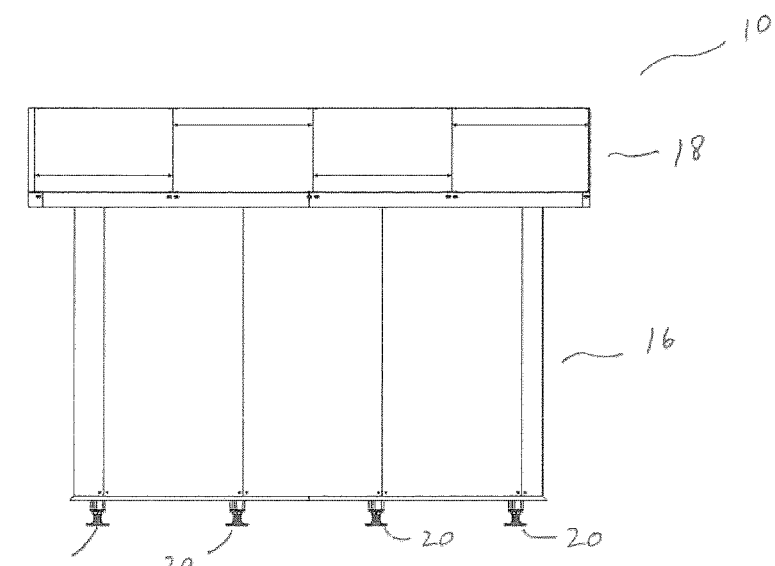
FIG. 1D is a rear elevation view of one embodiment of a shelter constructed from interlocking panels.

Before the present invention is described in further detail, it is to be understood that the invention is not limited to the particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention pertains. Although any methods and materials similar or equivalent to those described herein can also be used in the practice or testing of the present invention, a limited number of the exemplary methods and materials are described herein.

It must be noted that as used herein and in the appended claims, the singular forms "a," "an," and "the" include plural referents unless the context clearly dictates otherwise.

The present invention relates to shelters constructed from interlocking panels. As used herein, the term "shelter" refers to any structure used to house humans or animals and offers at least some protection from adverse environmental conditions, danger, and/or attack. The shelters are portable, sturdy and inexpensive, and can be conveniently and quickly assembled without requiring specialized building expertise or power tools, and disassembled for transport and re-deployment.

The invention will now be described having reference to the accompanying Figures.

Shelter

FIGS. 1A-1D show one embodiment of a shelter (10) of the present invention. The shelter (10) generally comprises a floor portion (12), wall portions including a top wall portion (14) and a bottom wall portion (16), and a roof portion (18). Support feet (20) elevate the shelter (10) above the ground. In one embodiment, a passageway (22) is provided to allow access the interior of shelter (10) or to accommodate a door therein. In one embodiment, an opening (24) accommodates glazing and/or screening to define a window allowing light into the interior of the shelter (10).

In an exemplary use, the shelter (10) provides housing in both emergency and non-emergency situations. In other exemplary uses, the shelter (10) is suitable for use as a dedicated medical, industrial, or educational facility.

Components of the Shelter

The components forming the shelter (10) are described in detail as follows.

i) Panels

Figure 2A:
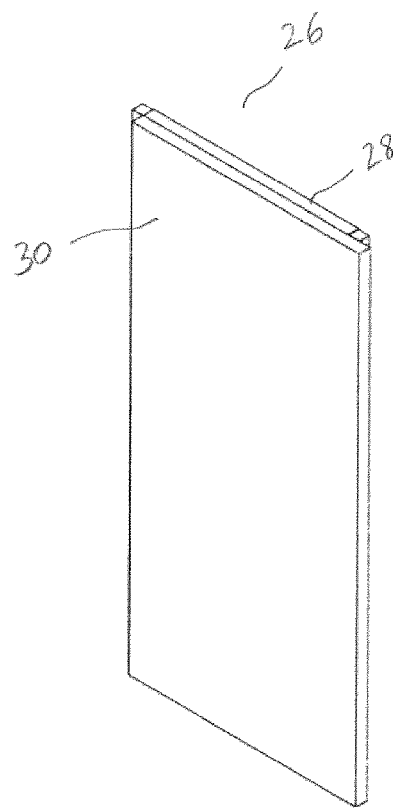
FIG. 2A is a perspective view of one embodiment of a panel for constructing a shelter.
Figure 2B:
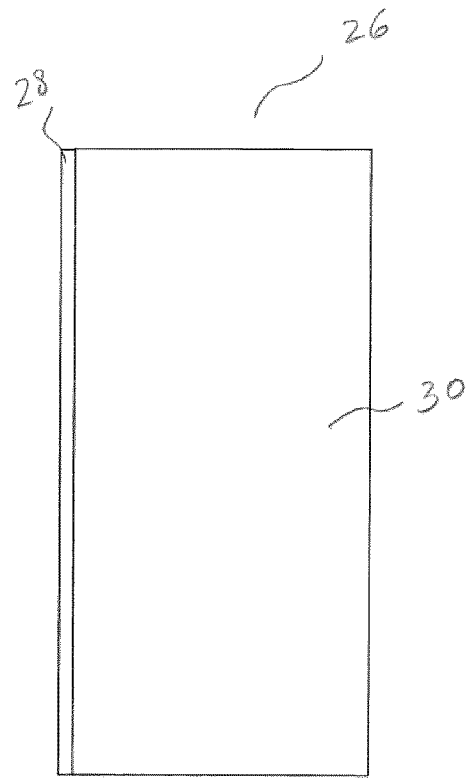
FIG. 2B is a side elevation view of one embodiment of a panel for constructing a shelter.
Figure 2C:
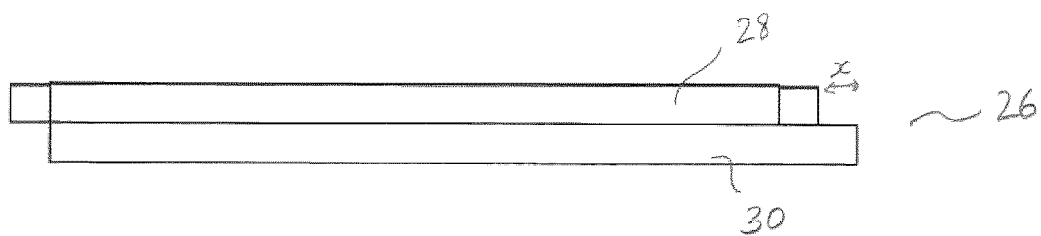
FIG. 2C is top view of one embodiment of a panel for constructing a shelter.

FIGS. 2A-2C show one embodiment of a panel (26) for the shelter (10) of the present invention. In one embodiment, the panel (26) has a double-wall construction comprising a first planar layer (28) and a second planar layer (30). As shown in FIG. 2C, the first planar layer (28) is offset by distance "x" from the second planar layer (30) to facilitate attachment of a connection assembly (32).

The panel (26) shown in FIGS. 2A and 2B is substantially rectangular-shaped. While FIGS. 2A-2C illustrate a rectangular panel suitable for use in the bottom wall portion (16) or floor portion (18), it will be appreciated by those skilled in the art that other shapes are included within the scope of the invention. As shown in FIGS. 1A-1D and 17, the panels (26) may be shaped as modified rectangles, squares, triangles, and the like. Such modified shaped panels (26) are suitable for use in the top wall portion (14).

The panel (26) may be formed of various materials including, but are not limited to, rigid foam insulation and the like. In one embodiment, the panel (26) is formed of rigid foam insulation. Suitable materials for each of the first planar layer (28) and second planar layer (30) may depend upon the intended use in a particular environment (e.g., flood, earthquake or fire-ravaged zone, community). Such materials are preferably rigid, durable, lightweight, and inexpensive.

The dimensions of the panel (26) are not essential to the invention and may be increased or decreased as may be required to satisfy any particular design objectives. The panel (26) may be sized to be portable and maneuvered manually by only one or two people to complete rapid construction of the shelter (10).

It will be appreciated that the panel (26) is simple but rugged in construction that it can be made at low cost. The panel (26) may be easily fabricated. The panel (26) is preferably of one-piece construction, and formed as a single, integral unit combining the first planar layer (28) and second planar layer (30). However, the first planar layer (28) and second planar layer (30) may also be manufactured separately as components which are adhered together to form the panel (26).

The panel (26) may be formed by processes known in the art. In one embodiment, each of the first planar layer (28) and a second planar layer (30) are measured and cut from rigid foam insulation, and attached together using suitable fastening mechanisms or adhesives. Portions of the panel (26) may be cut out to provide a passageway (22) for a door or openings (24) for windows.

If desired, the configuration (i.e., shape, size, number) of the panel (26) can vary from that shown in FIGS. 2A-2C. For example, the size of the panels (26) can be increased to decrease the number of panels (26) and other components required to construct the shelter (10). In general, the panel (26) requires few components, making the panel (26) amenable to rapid assembly and minimizing expense in manufacturing. The panels (26) are conveniently stackable to enable storage and transport to a site for construction of the shelter (10).

ii) Panel Assembly

Figure 3:
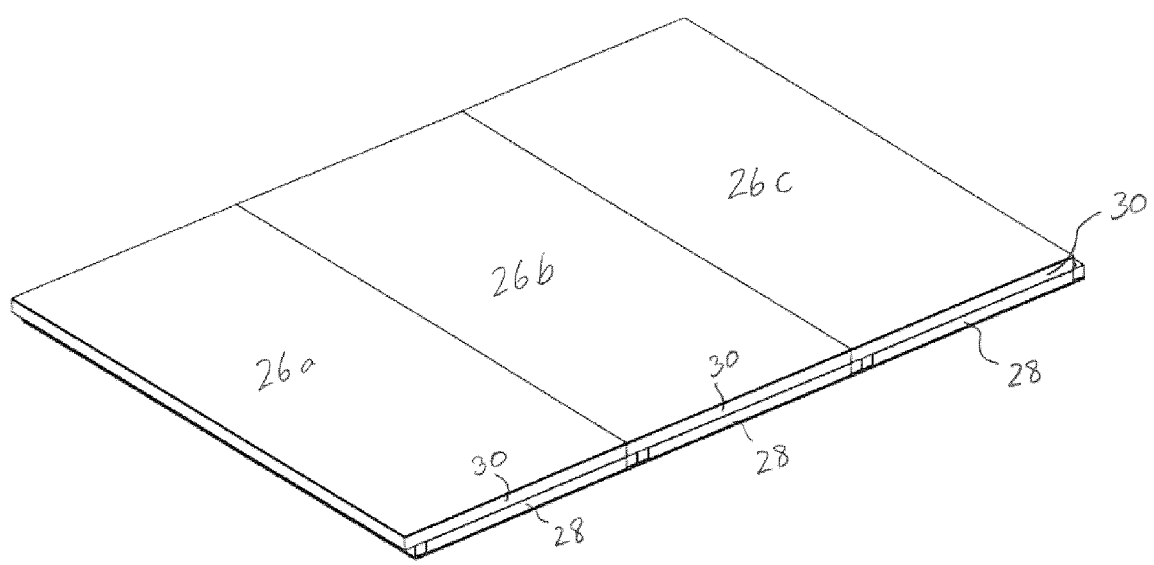
FIG. 3 is a perspective view of one embodiment of a panel assembly.

Multiple panels (26) may be assembled together to construct the shelter (10). As shown in FIG. 3, each panel (26a, 26b, 26c) is oriented substantially parallel to one or more adjacent panels. As used herein, the term "adjacent" means near, close, adjoining, or contiguous. Each panel (26a, 26b, 26c) is detachably connected to an adjacent panel along at least one elongate side edge or along both elongate side edges, thereby allowing each panel (26a, 26b, 26c) to abut side-by-side with an adjacent panel.

Conveniently, few panels (26) are required to construct the shelter (10). In one embodiment shown in FIGS. 1A-1D, the panels (26) form the floor portion (12), top wall portion (14), bottom wall portion (16), and roof portion (18).

When the shelter (10) is disassembled for transport and re-deployment, each of the floor portion (12), top wall portion (14), bottom wall portion (16), and roof portion (18) is disassembled by detaching each panel (26) from any adjacent panel. Assembly and disassembly can be conducted without specialized building expertise or power tools.

iii) Connection Assembly

Figure 4A:
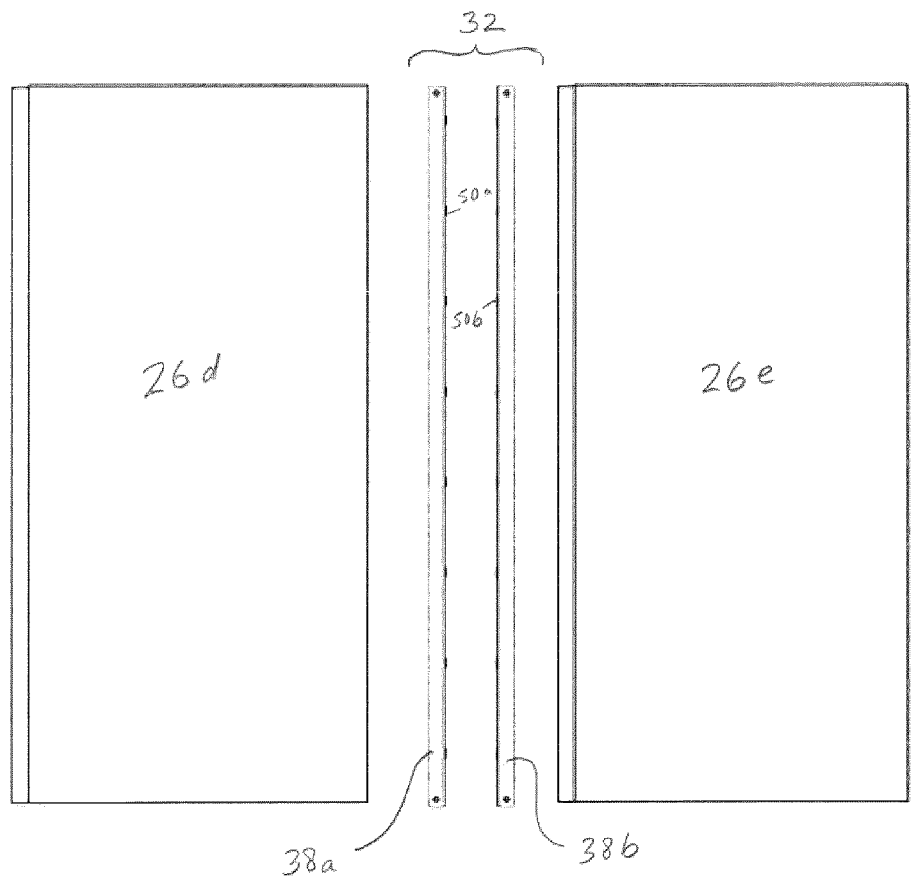
FIG. 4A is an exploded side elevation view of one embodiment of a connection assembly and two panels to be connected.
Figure 4B:
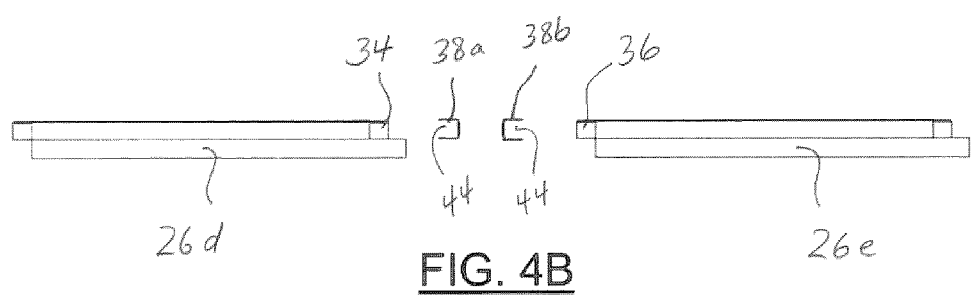
FIG. 4B is an exploded top plan view of one embodiment of a connection assembly and two panels to be connected.

Adjacent panels (26) are assembled together using a connection assembly (32). An exemplary embodiment of the connection assembly (32) for connecting a pair of adjacent panels (26d, 26e) is shown in FIGS. 4A and 4B. The first panel (26d) includes a first elongate side edge (34), while the second panel (26e) includes a second elongate side edge (36).

The connection assembly (32) comprises a pair of elongate female (38a) and male (38b) brackets. Each bracket (38a, 38b) comprises an upper portion (40) and parallel opposed side walls (42) forming a channel (44) on the underside of the bracket (38a, 38b), resulting in an open-side-down "U-shaped" cross-section of the bracket (38a, 38b). The upper portion (40) and side walls (42) of the bracket (38a, 38b) are suitably sized and configured to accommodate and engage an elongate side edge (34, 36) of the panel (26d, 26e). The side walls (42) define openings (46) at each end (48) through which attachment means can extend. In one embodiment, the bracket (38a, 38b) has a length substantially similar to the length of the elongate side edge (34, 36) of the panel (26d, 26e). In one embodiment, the bracket (38a, 38b) may be either in the form of a separate component which accommodates the elongate side edge (34, 36) of the panel (26d, 26e), or integral to the elongate side edge (34, 36) of the panel (26d, 26e).

The brackets (38a, 38b) can be constructed from any material or combination of materials having suitable properties such as, for example, mechanical strength, ability to withstand cold and adverse field conditions, corrosion resistance, and ease of machining. The brackets (38a, 38b) may be formed of galvanneal steel, or other appropriate materials known to those skilled in the art. Preferably, the brackets (38a, 38b) are formed of galvanneal steel to ensure that the brackets (38a, 38b) are as lightweight and portable as possible for easy handling.

The bracket (38a) comprises attachment means for detachably connecting to an adjacent bracket (38b), thereby interconnecting the adjacent panels (26d, 26e) engaged by each bracket (26a, 26b). Suitable attachment means include any appropriate system or component that can be used to connect adjacent brackets (26a, 26b).

In one embodiment shown in FIGS. 5A-5B and 6A-6D, the attachment means comprises clip members (50a, 50b) having recessed notches (52a, 52b) defined by the upper portion (40) of the bracket (38a, 38b). The clip members (50a) on the female bracket (38a) are in the form of upwardly projecting tabs (FIG. 6C-6D), whereas the clip members (50b) on the male bracket (38b) are in the form of downwardly projecting tabs (FIGS. 6A-6B). The notches (52a, 52b) are configured to receive and secure the clip members (50b, 50a). The clip members (50a) of the female bracket (38a) are configured to engage the corresponding notches (52b) of the clip members (50b) of the male bracket (38b). The clip members (50b) of the male bracket (38b) are configured to engage the corresponding notches (52a) of the clip members (50a) of the female bracket (38a). In one embodiment, the clip members (50a, 50b) are spaced apart and evenly distributed along the entire length of the bracket (38a, 38b) or a portion thereof.

Figure 9A:
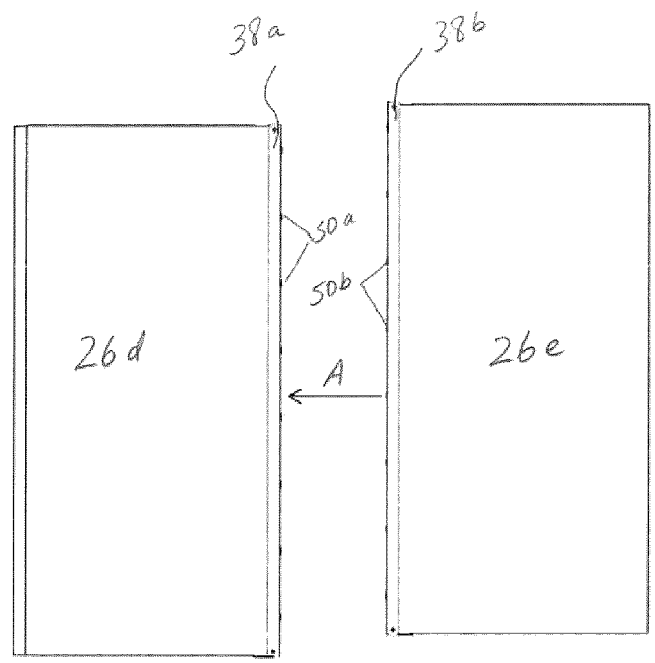
FIGS. 9A and 9B are side elevation views showing connection of adjacent panels using the connection assembly of FIGS. 5A-5B.
Figure 9B:
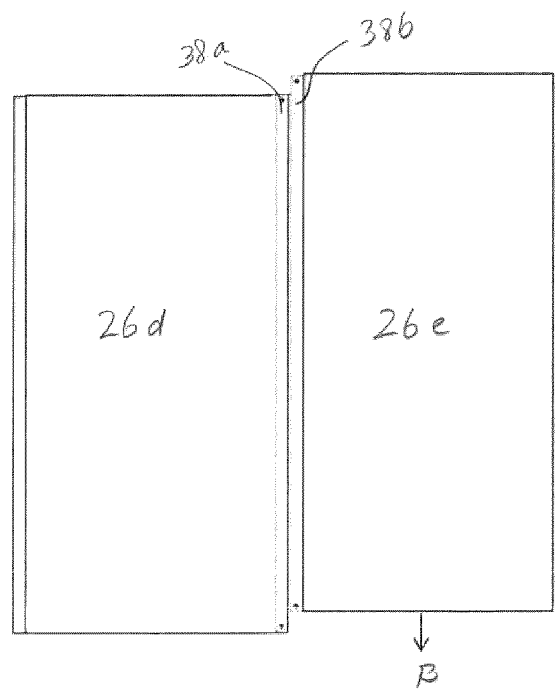
Figure 10A:
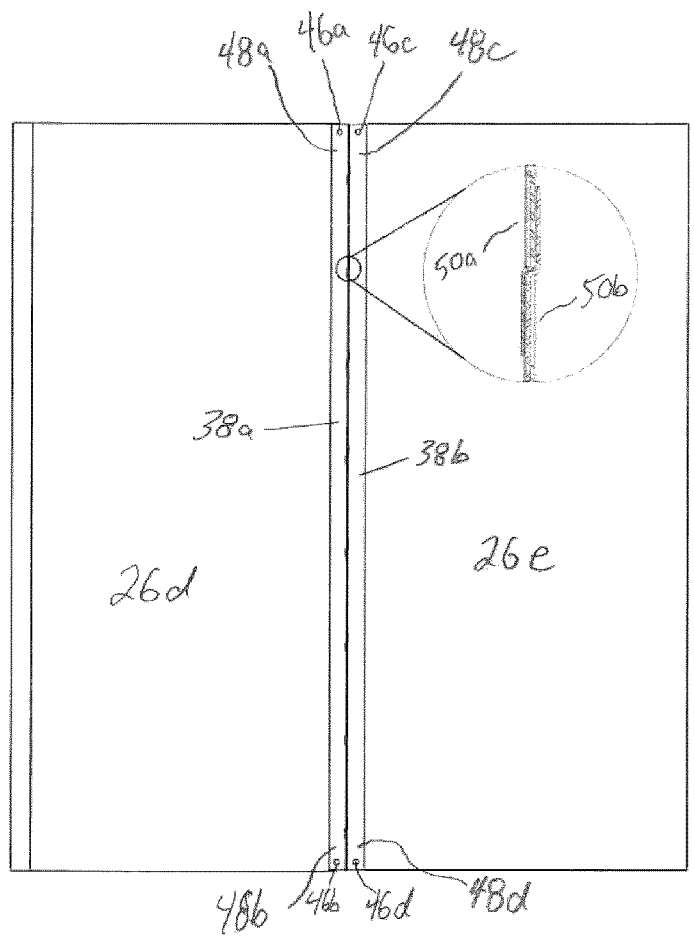
FIG. 10A is a side elevation view of one embodiment of adjacent interconnected panels, showing a partial enlargement, cross-sectional view of two interlocked complementary clips.

As shown in FIGS. 9A-9B, the panels (26d, 26e) are connected in a side-by-side abutment by positioning the female and male brackets (38a, 38b) in alignment towards each other in a direction "A" (FIG. 9A), and sliding the male bracket (38b) downwardly relative to the female bracket (38a) in a longitudinal direction "B" (FIG. 9B) in order to engage the clip members (50b, 50a) with the corresponding notches (52a, 52b). As used herein, the term "longitudinal" means extending along the long axis or in the direction of the length of the bracket (38a, 38b). Once all clip members (50b, 50a) engage the corresponding notches (52a, 52b), the panels (26d, 26e) abut side-by-side and in parallel (FIG. 10A).

Figure 7A:
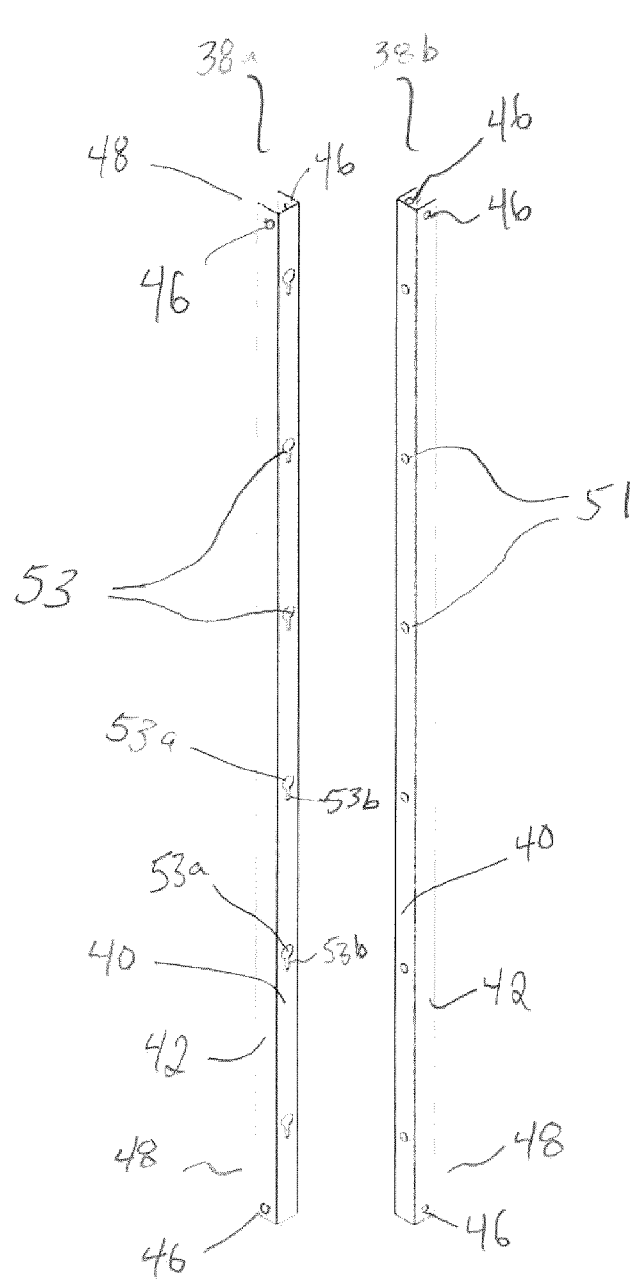
FIG. 7A is a perspective view of a second embodiment of a connection assembly.
Figure 7B:
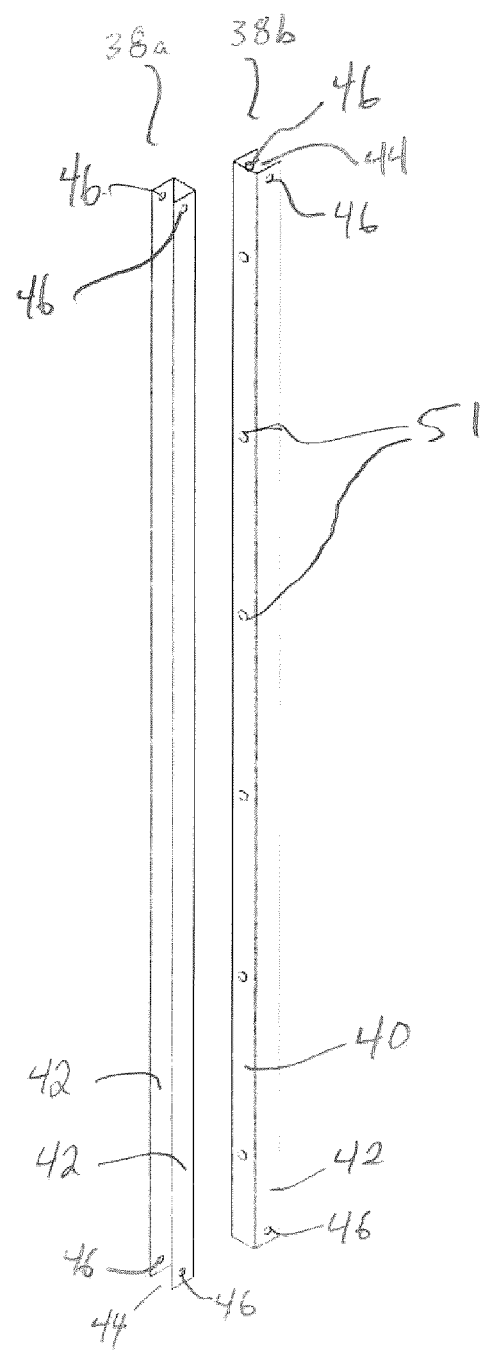
FIG. 7B is a perspective view of the embodiment of the connection assembly shown in FIG. 7A.
Figure 7C:
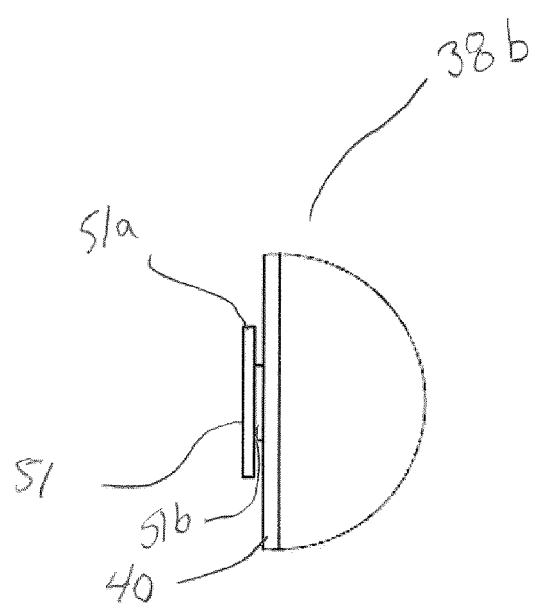
FIG. 7C is a side elevation view of one embodiment of a pin member used for connection of the connection assembly of FIGS. 7A-7B.

In another embodiment shown in FIGS. 7A-7C, the attachment means comprises pin members (51) and corresponding keyholes (53). The pin members (51) are positioned to project outwardly from the upper portion (40) of the male bracket (38b). Each pin member (51) comprises a head (51a) and neck (51b). The upper portion (40) of the female bracket (38a) defines the keyholes (53) which extend therethrough. Each keyhole (53) comprises an enlarged portion (53a) configured to allow insertion of the head (51a) of the pin member (51) therethrough, and an adjacent reduced portion (53b) projecting from the bottom of the enlarged portion (53a) and configured to allow insertion of the neck (51b), but not the head (51a). In one embodiment, the pin member (51) comprises a circular-shaped head (51a). In one embodiment, the keyhole (53) comprises a corresponding circular-shaped enlarged portion (53a) and a rectangular-shaped reduced portion (53b) having a width smaller than the diameter of the circular-shaped enlarged portion (53a). In one embodiment, the pin members (51) and keyholes (53) are spaced apart and evenly distributed along the entire length of the bracket (38b, 38a) or a portion thereof.

Figure 10B:
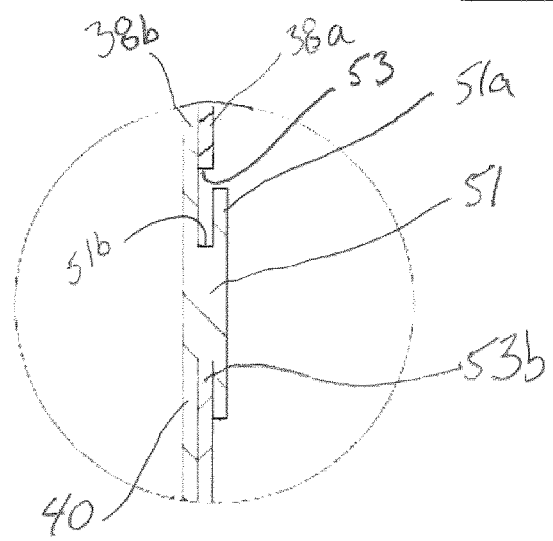
FIG. 10B is a partial enlargement, cross-sectional view of a pin interlocked with a complementary keyhole.

As shown in FIG. 10B, the male bracket (38b) is attached to the female bracket (38a) by inserting the head (51a) of the pin member (51) through the enlarged portion (53a) of the keyhole (53), and sliding the male bracket (38b) downwardly relative to the female bracket (38a) in longitudinal direction "B" to insert the neck (51b) of the pin member (51) through the reduced portion (53b). Since the reduced portion (53b) allows insertion of the neck (51b) but not the head (51a), the pin member (51) is held by the keyhole (53) and its removal therefrom is prevented. Once all pin members (51) are inserted into the corresponding keyholes (53), the panels (26d, 26e) abut side-by-side and in parallel.

Figure 8A:
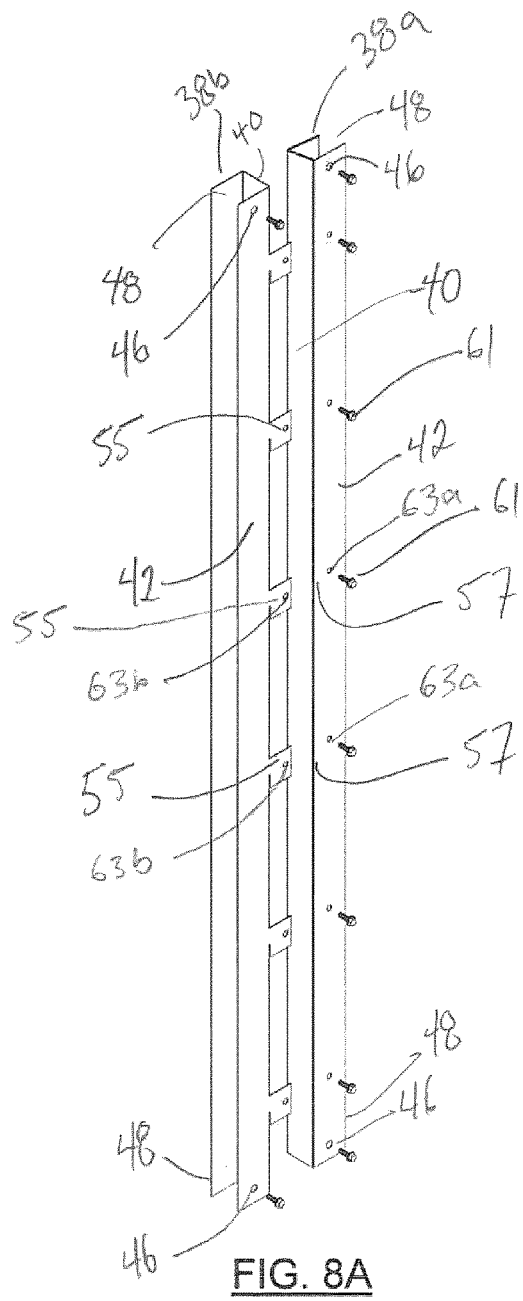
FIG. 8A is a perspective view of a third embodiment of a connection assembly.
Figure 8B:
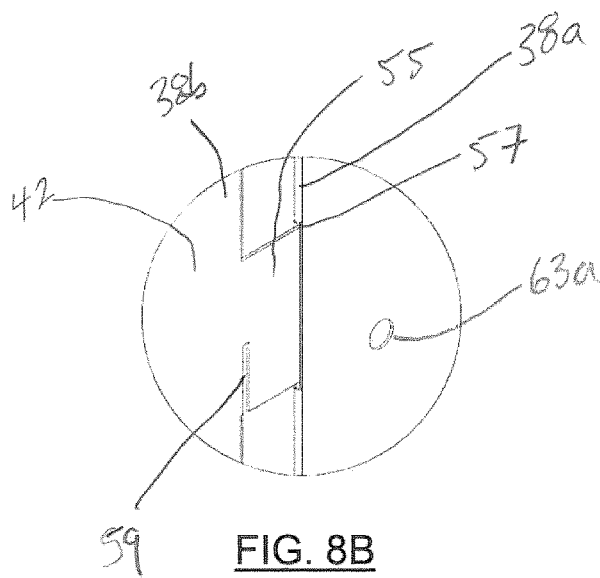
FIG. 8B is a perspective view of one embodiment of a tab and slot used in the connection assembly shown in FIG. 8A.
Figure 8C:
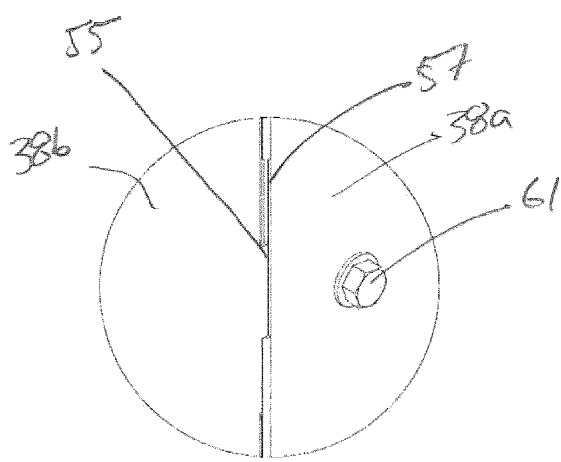
FIG. 8C is a perspective view of the tab and slot shown in FIG. 8B with the tab fully received in the slot.

In another embodiment shown in FIGS. 8A-8C, the attachment means comprises tabs (55) and corresponding slots (57). The tabs (55) are formed integral with a side wall (42) of the male bracket (38b), and extend from the edge of the side wall (42) beyond the upper portion (40) of the male bracket (38b) In one embodiment, each tab (55) is square- or rectangular-shaped, and defines a notch (59) and an aperture (63b). A longitudinal edge of the upper portion (40) of the female bracket (38a) defines slots (57) configured to receive the tabs (55). A side wall (42) of the female bracket (38a) adjacent to the longitudinal edge defines openings (63a). In one embodiment, the tabs (55) and slots (57) are spaced apart and evenly distributed along the entire length of the bracket (38a, 38b) or a portion thereof.

Figure 10C:
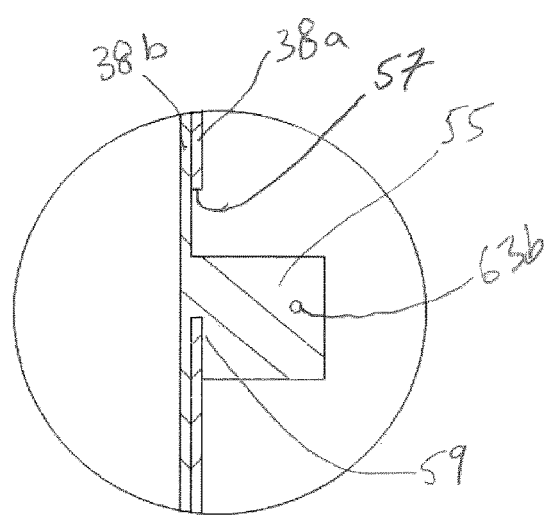
FIG. 10C is a partial enlargement, cross-sectional view of a tab interlocked with a complementary slot.

As shown in FIG. 10C, the male bracket (38b) is attached to the female bracket (38a) by inserting the tab (55) into the slot (57), and sliding the male bracket (38b) downwardly relative to the female bracket (38a) in longitudinal direction "B" to engage the notch (59) with the slot (57). Since the notch (59) engages the slot (57), the tab (55) is held by the slot (57) and its removal therefrom is prevented.

In one embodiment, the tabs (55) are fixedly attached within the slots (57) by bolts (61) to prevent undesired disassembly of the tabs (55) and slots (57). When the tab (55) is held by the slot (57), the aperture (63b) of the tab (55) aligns with the opening (63a) of the side wall (42). The bolt (61) is inserted through both the opening (63a) and aperture (63b), thereby fixedly attaching the tabs (55) within the slots (57). In one embodiment, the aperture (63b), opening (63a), or both are threaded to mate with corresponding threads of the bolt (61). The aperture (63b), opening (63a), or both are threaded with a female thread, and the bolt (61) is threaded with a male thread. Once all tabs (55) are inserted into the corresponding slots (57), the panels (26d, 26e) abut side-by-side and in parallel.

The panels (26d, 26e) are disconnected by sliding the male bracket (38b) upwardly relative to the female bracket (38a) in order to disengage the respective attachment means; i.e., clip members (50b, 50a) from within the corresponding notches (52a, 52b); pin members (51) from the corresponding keyholes (53); or tabs (55) from the corresponding slots (57).

iv) Locking Elements

Figure 11:
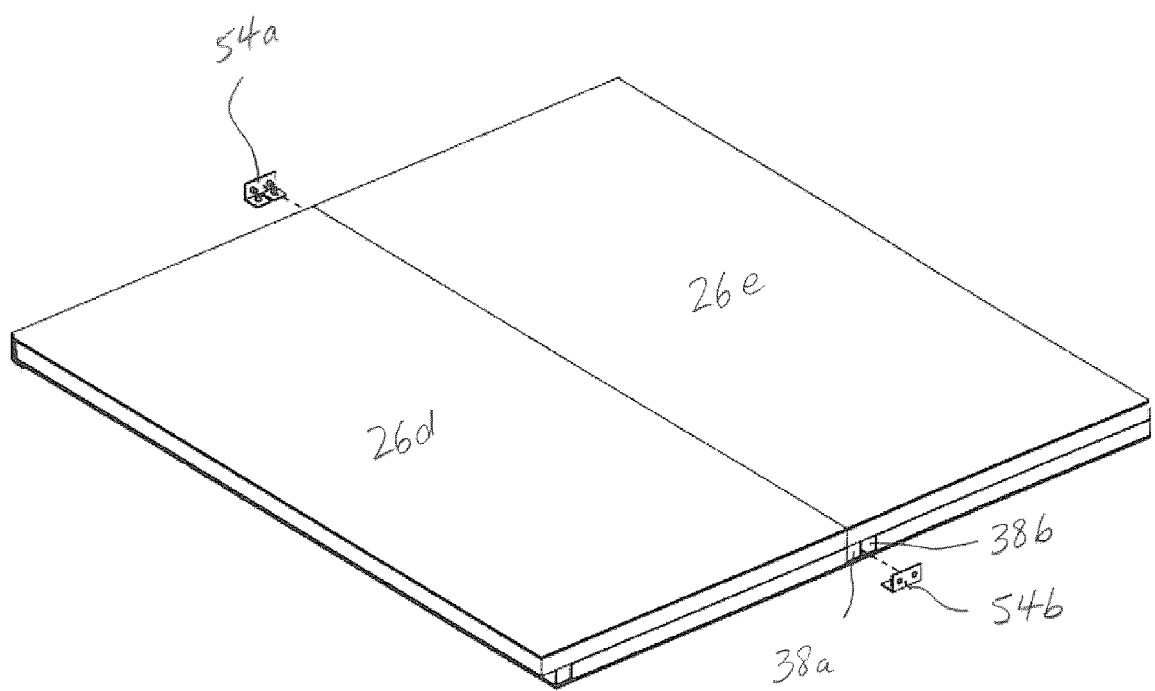
FIG. 11 is a perspective view of the adjacent interconnected panels of FIG. 10A, showing the insertion of one embodiment of a locking element.

In one embodiment shown in FIG. 11, locking elements (54a, 54b) are fastened to either one or both ends (48a, 48b, 48c, 48d) of the brackets (38a, 38b) to lock the brackets (38a, 38b) together, thereby preventing longitudinal displacement of the male bracket (38b) in relation to the female bracket (38a) and ensuring a relatively strong, stable connection between the panels (26d, 26e). In one embodiment, locking elements (54a, 54b) are attached at both ends (48a, 48b, 48c, 48d) of the brackets (38a, 38b).

Figure 12A:
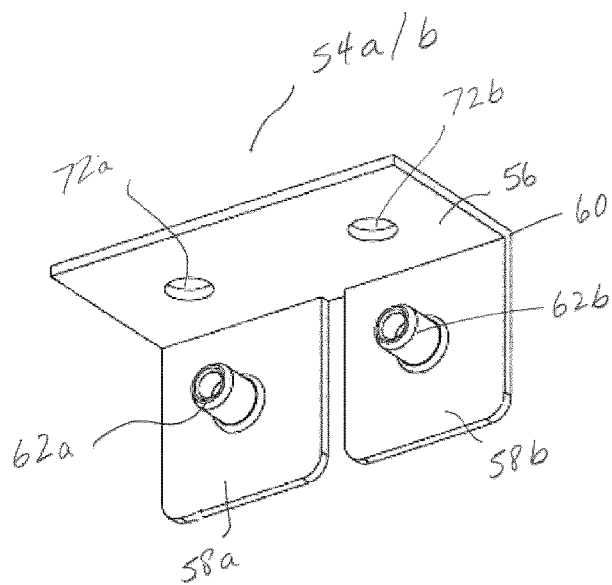
FIG. 12A is perspective view of a first embodiment of a locking element.
Figure 12B:
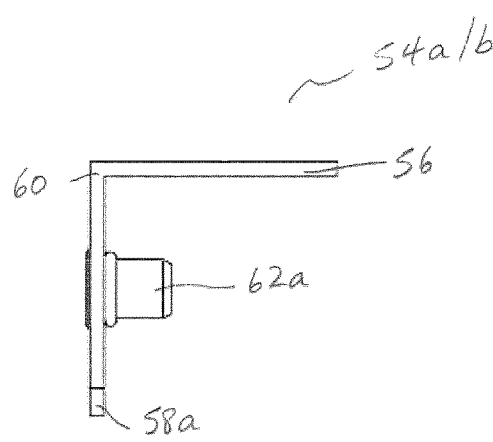
FIG. 12B is a side elevation view of the locking element of FIG. 12A.
Figure 12C:
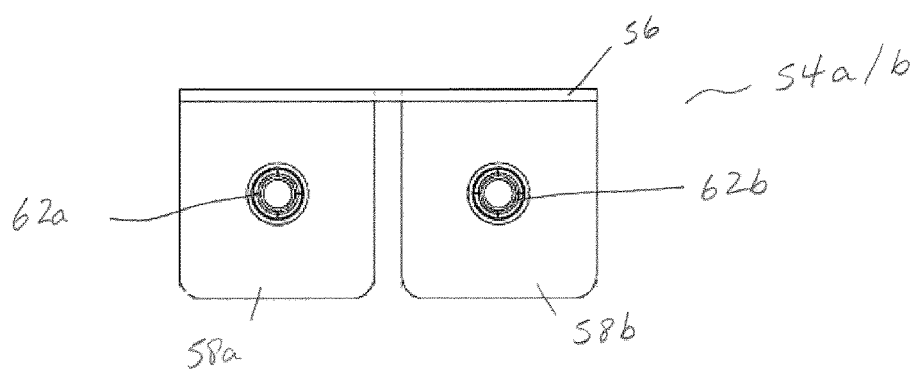
FIG. 12C is a rear elevation view of the locking element of FIG. 12A.

In one embodiment shown in FIGS. 12A-12C, the locking element (54a, 54b) is substantially "L-shaped" when viewed in cross-section and includes a side plate (56) and first and second arms (58a, 58b) extending perpendicularly from the base (60) of the side plate (56).

Each of the first and second arms (58a, 58b) supports a threaded rivet (62a, 62b) disposed in the center of each of the first and second arms (58a, 58b). The rivets (62a, 62b) are inserted into the ends (48a, 48b, 48c, 48d) of the brackets (38a, 38b). Attachment means extend through the rivets (62a, 62b) into contact with the corresponding openings (46a, 46b, 46c, 46d) at the ends (48a, 48b, 48c, 48d) of the brackets (38a, 38b) to secure the locking element (54a, 54b) to the brackets (38a, 38b).

Suitable attachment means include, any suitable system or component that can be driven, screwed, or otherwise forced through the rivets (62a, 62b) and openings (46a, 46b, 46c, 46d), including without limitation, bolts, screws, or any other fasteners commonly used in construction. In one embodiment, when the locking element (54a, 54b) is mounted over the ends (48a, 48b, 48c, 48d) of the brackets (38a, 38b), passing fasteners (64a, 64b, 64c, 64d) such as, for example, bolts, through the rivets (62a, 62b) secures the locking element (54a, 54b) to the bracket (38a, 38b).

Figure 13A:
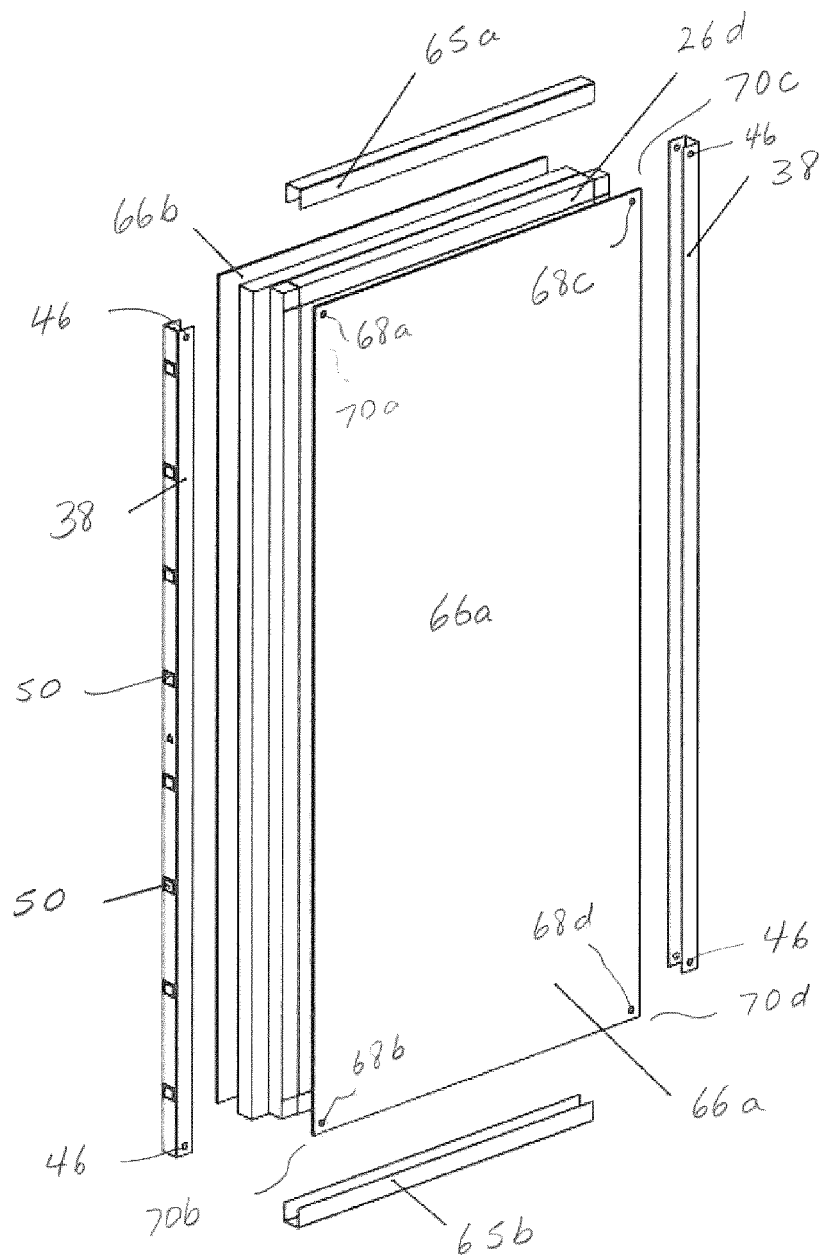
FIG. 13A is an exploded perspective view of one panel of FIG. 11.
Figure 13B:
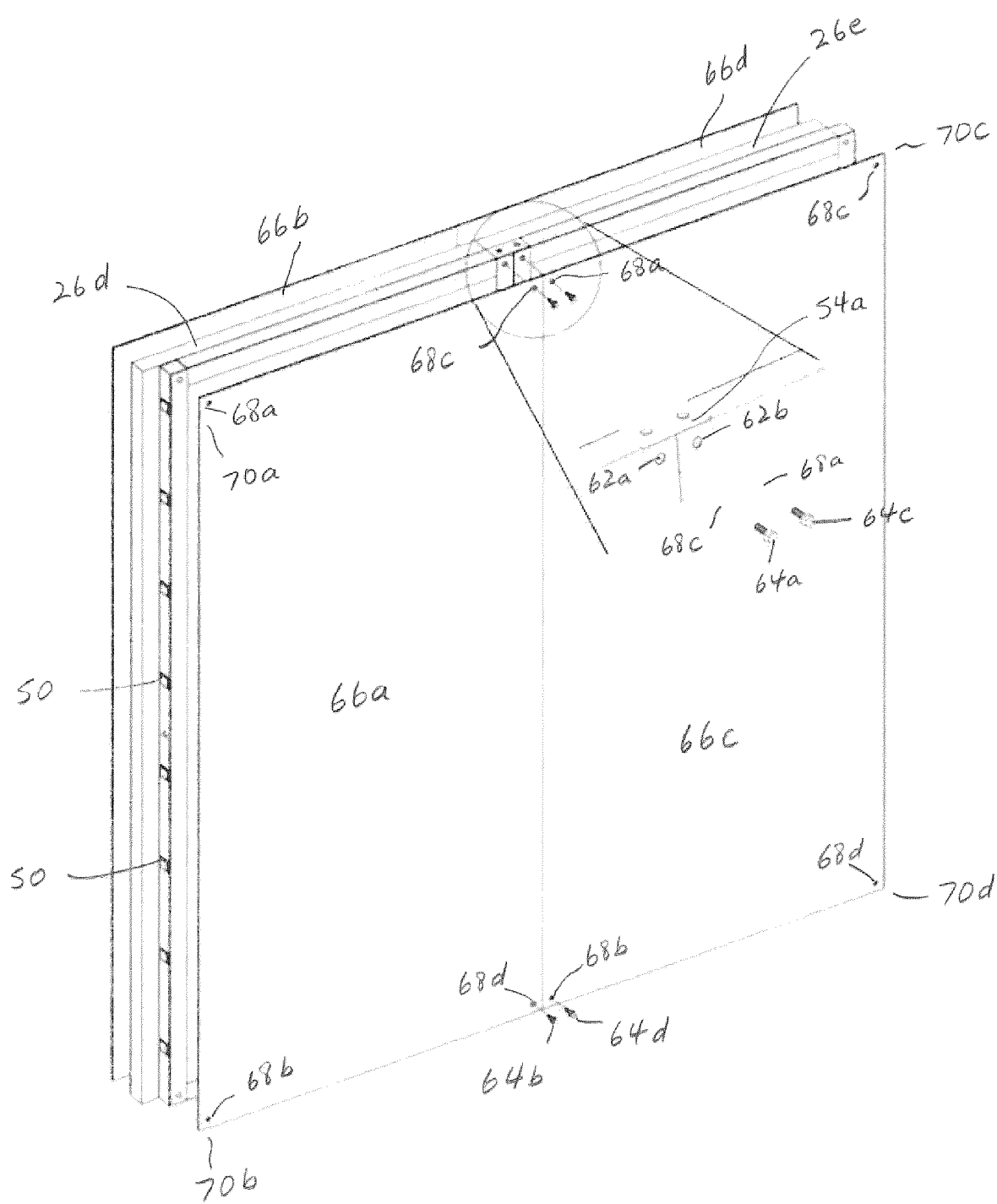
FIG. 13B is an exploded perspective view of the adjacent interconnected panels of FIG. 11, showing a partial enlargement view of bolts being inserted through planar boards into the locking elements.

In one embodiment shown in FIGS. 13A-13B, reinforcing brackets (65a, 65b) bridge the female and male brackets (38a, 38b) on the top and bottom horizontally. The reinforcing brackets (65a, 65b) may be formed of galvanneal steel, or other appropriate materials known to those skilled in the art.

Planar boards (66a, 66b, 66c, 66d) are configured in substantially the same dimensions as those of the panels (26d, 26e) and define bores (68a, 68b, 68c, 68d) at their corners (70a, 70b, 70c, 70d). The fasteners (64a, 64b, 64c, 64d) extend through the bores (68a, 68b, 68c, 68d) to fasten the planar boards (66a, 66b, 66c, 66d) to the locking element (54a), thereby covering and protecting the panels (26d, 26e), and strengthening and improving the aesthetics of the shelter (10). In one embodiment, the planar boards (66a, 66b, 66c, 66d) comprise magnesium oxide wallboard. Magnesium oxide wallboard is stiff, strong, and inexpensive. As shown in FIGS. 13A-13B, magnesium oxide wallboards may be used to sandwich the rigid foam insulation layers (i.e., the first planar layer (28) and the second planar layer (30)).

Figure 17:
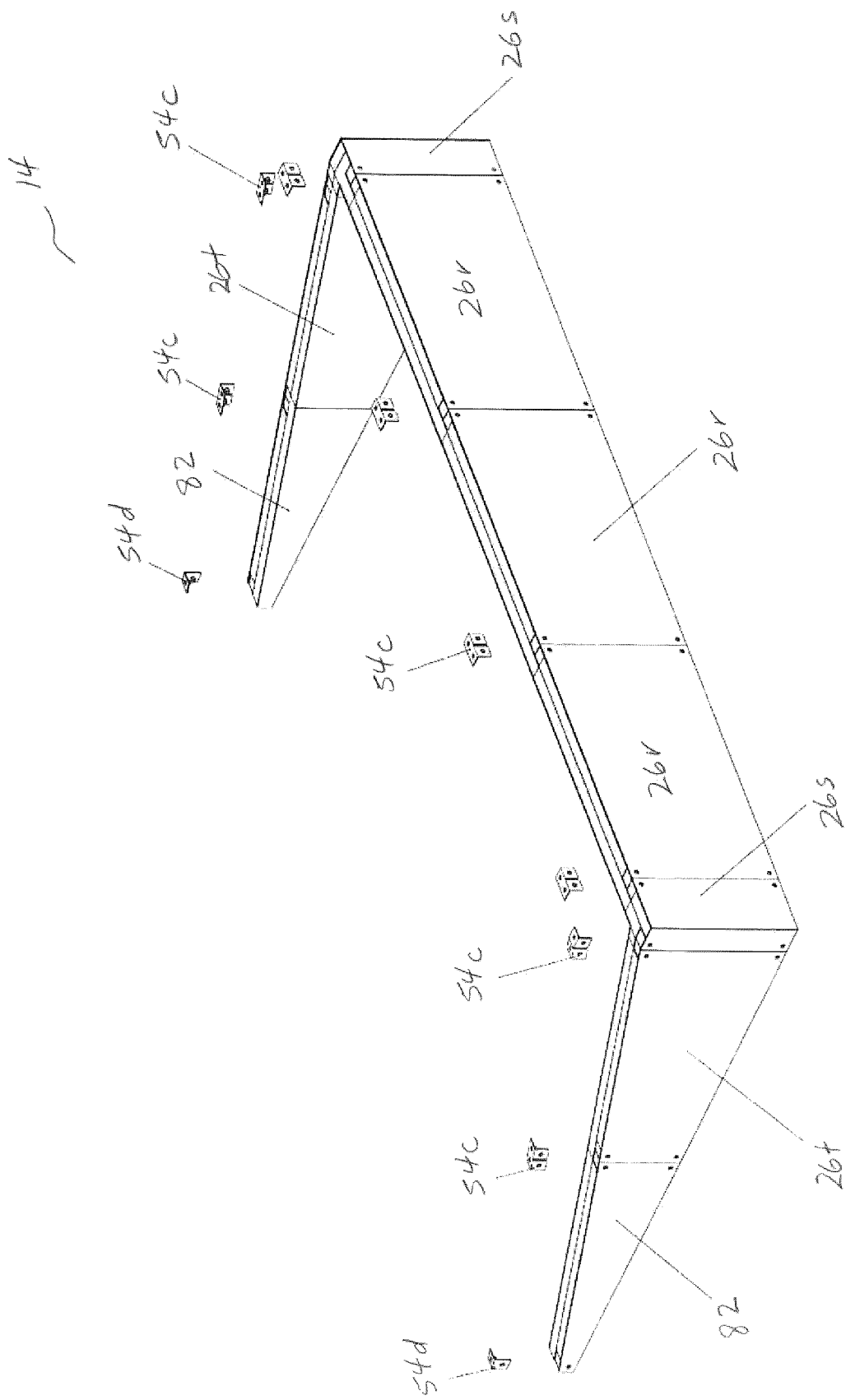
FIG. 17 is an exploded perspective view of one embodiment of a top wall portion.
Figure 19:
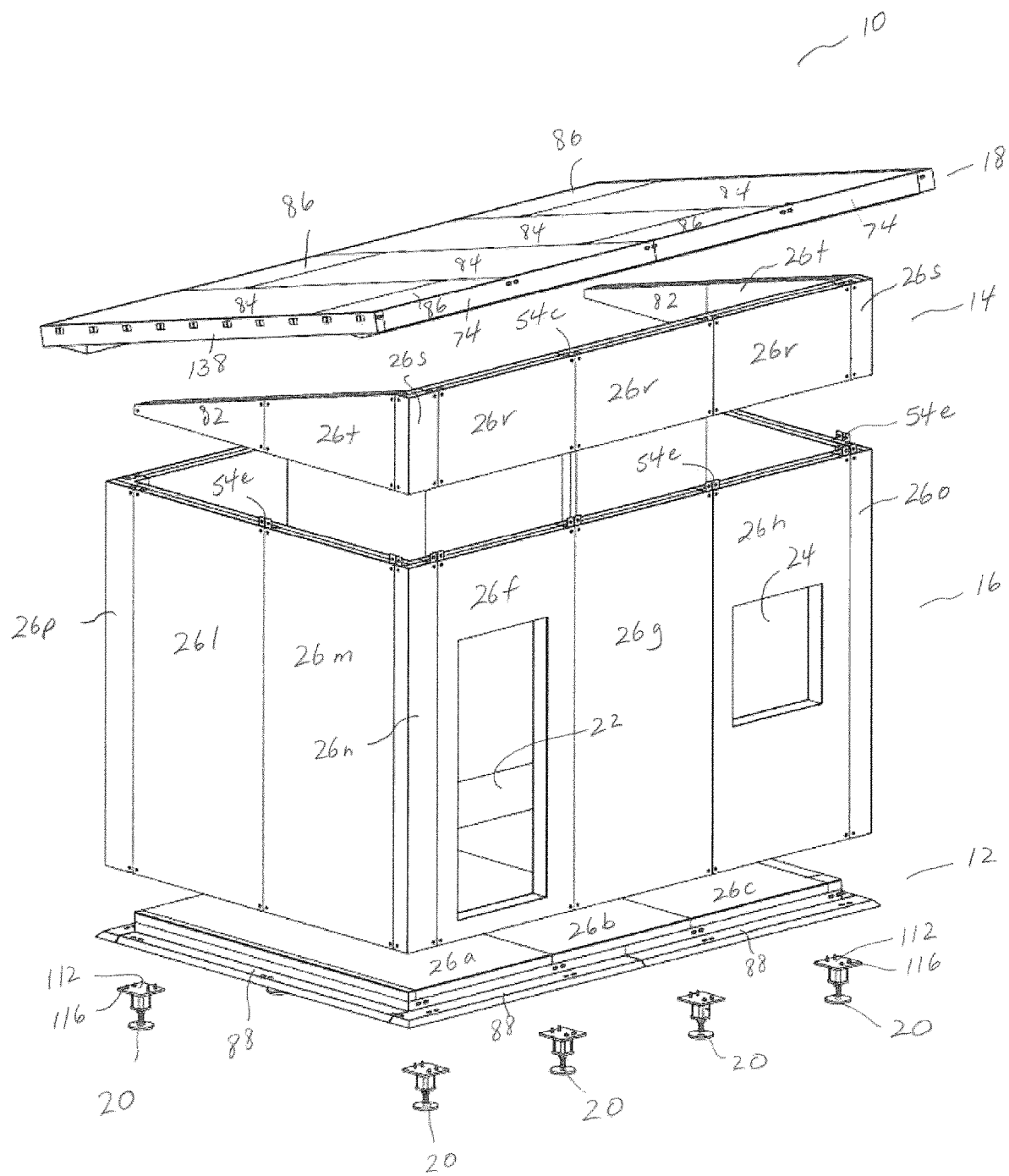
FIG. 19 is an exploded perspective view of one embodiment of a shelter constructed from interlocking panels.

This configuration of the locking element (54a, 54b) is also suitable for securely fastening the top wall portion (14) to the roof portion (18), as shown in FIGS. 17 and 19. The side plate (56) defines apertures (72a, 72b) through which attachment means can extend into contact with the roof portion (18) to attach the roof portion (18) to the top wall portion (14).

Variations of the locking element (54a, 54b) other than that shown in FIGS. 12A-12C can be used depending on the desired connection.

Figure 12D:
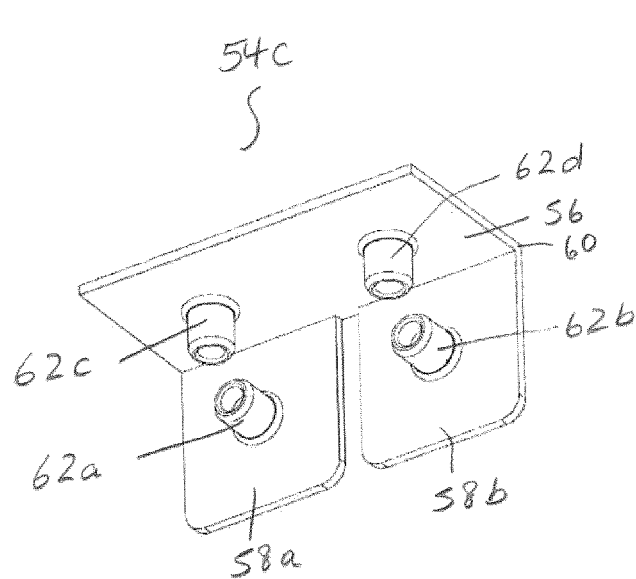
FIG. 12D is perspective view of a second embodiment of a locking element.
Figure 16:
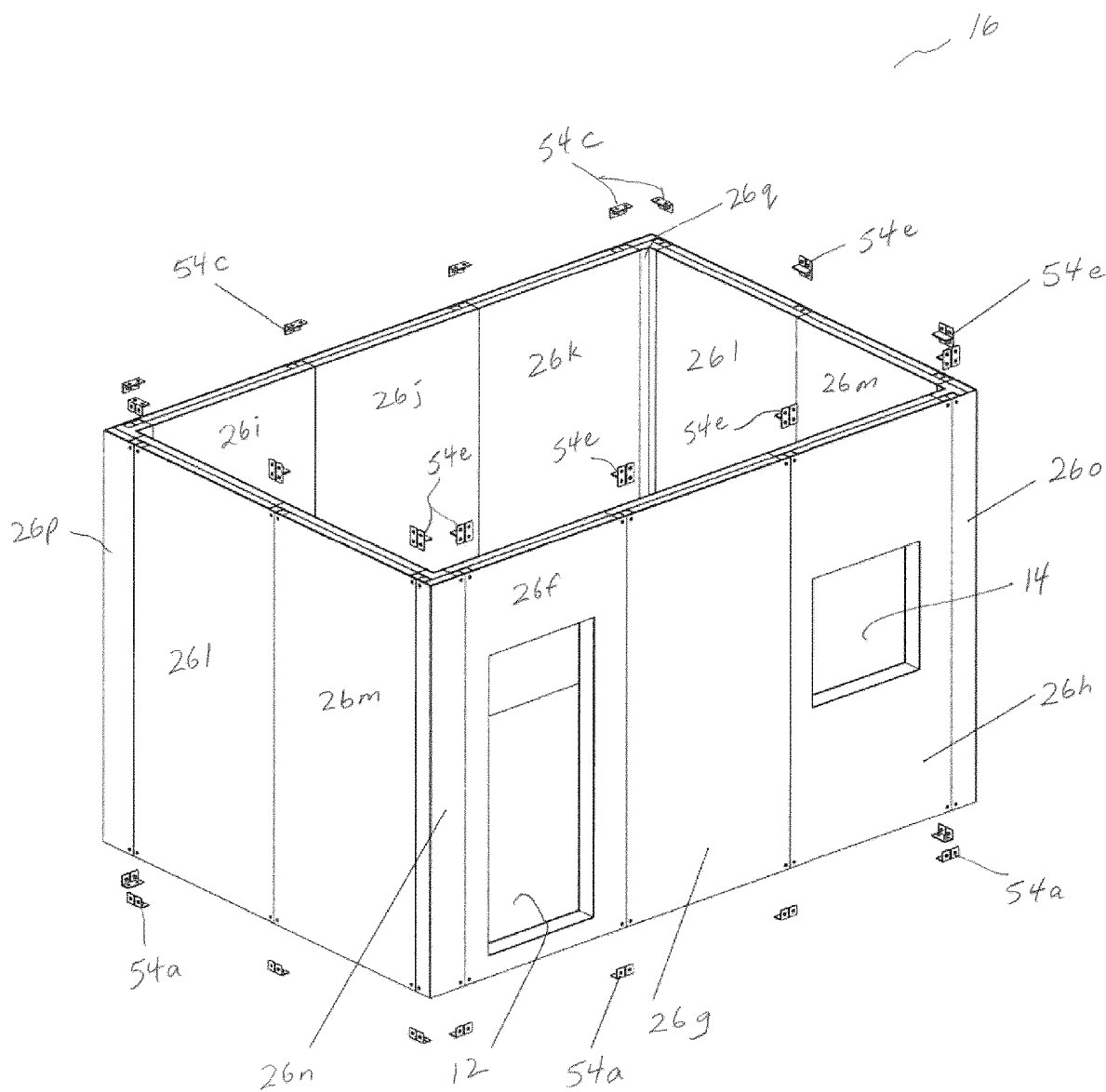
FIG. 16 is an exploded perspective view of one embodiment of a bottom wall portion.
Figure 18:
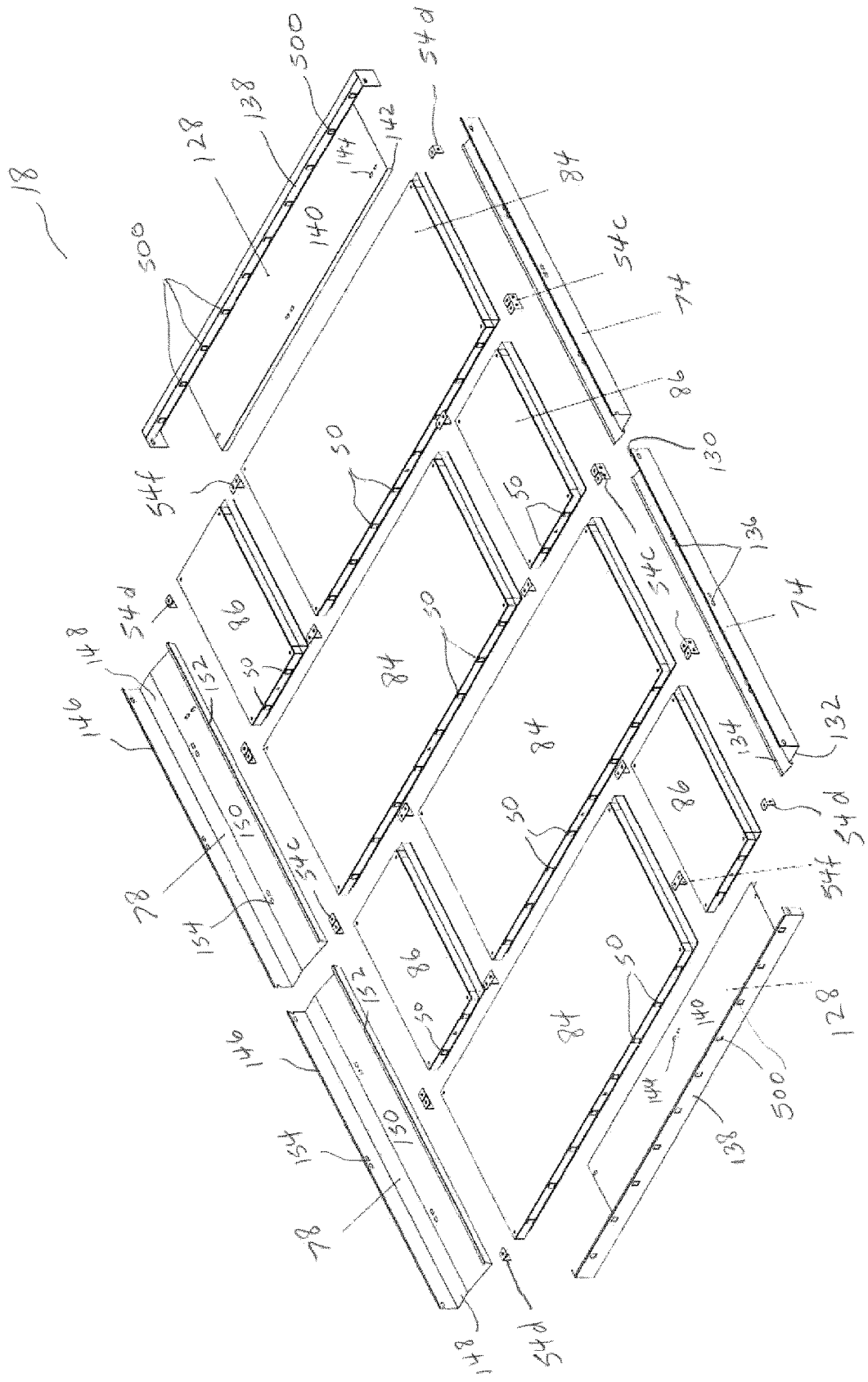
FIG. 18 is an exploded perspective view of one embodiment of a roof portion.

In one embodiment shown in FIG. 12D, the side plate (56) of the locking element (54c) includes threaded rivets (62c, 62d) instead of apertures (72a, 72b). This configuration of the locking element (54c) is suitable for example, for securing the front trim connection (74) to the front roof panels (84, 86) as shown in FIGS. 18 and 19; the top wall portion (14) to the roof portion (18) as shown in FIGS. 17 and 19; and the bottom wall portion (16) to the top wall portion (14) as shown in FIGS. 16 and 19.

Figure 12E:
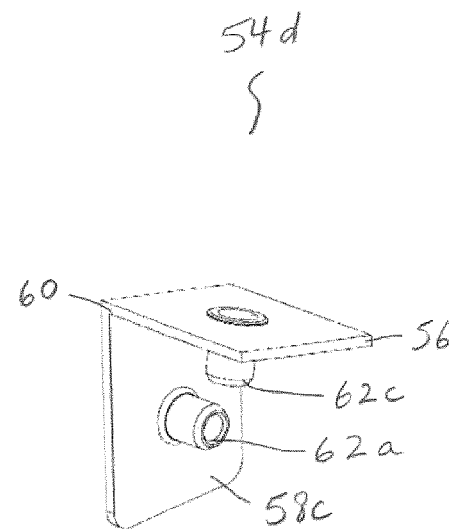
FIG. 12E is perspective view of a third embodiment of a locking element.

In one embodiment shown in FIG. 12E, the locking element (54d) includes a single arm (58c). This configuration of the locking element (54d) is suitable for example, for securing the front and rear trim connections (74, 78) to the front and rear roof panels (84, 86) as shown in FIGS. 18 and 19; and the sloped triangular-shaped panels (82) of the top wall portion (14) to the roof portion (18) as shown in FIGS. 17 and 19.

Figure 12F:
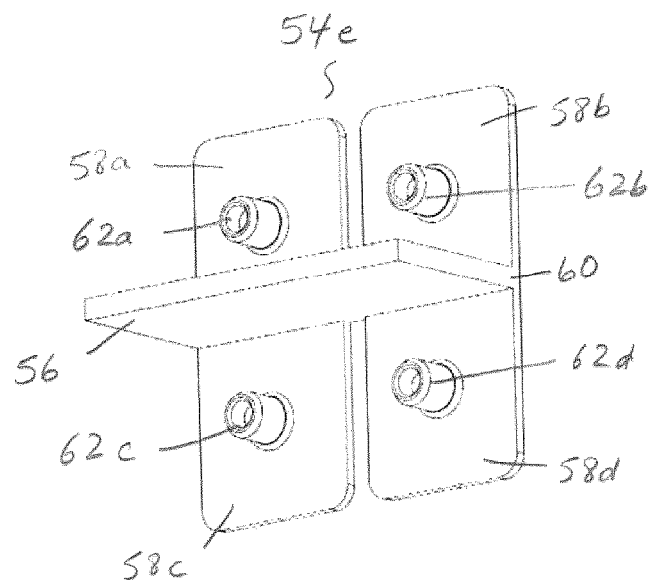
FIG. 12F is perspective view of fourth embodiment of a locking element.

In one embodiment shown in FIG. 12F, the locking element (54e) is substantially "T-shaped" when viewed in cross-section and includes a side plate (56) and two sets of first and second arms (58a, 58b, 58c, 58d) extending perpendicularly from the base (60) on both sides of the side plate (56), and supporting threaded rivets (62a, 62b, 62c, 62d). This configuration of the locking element (54e) is suitable for securely fastening the brackets (38a, 38b), and the bottom wall portion (16) to the top wall portion (14), as shown in FIGS. 16 and 19.

Figure 12G:
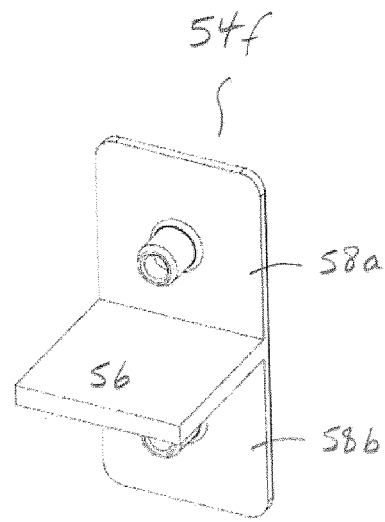
FIG. 12G is perspective view of a fifth embodiment of a locking element.

In one embodiment shown in FIG. 12G, the locking element (54f) includes a single arm (58a, 58b) on both sides of the side plate (56). This configuration of the locking element (54f) is suitable for securing the mosaic of large and small rectangular-shaped panels (84, 86) as shown in FIGS. 18 and 19.

The locking elements (54a, 54b, 54c, 54d, 54e, 54f) may be formed of uncoated steel, or other appropriate materials known to those skilled in the art.

Construction of the Shelter

As shown in FIG. 19, the floor portion (12), wall portions including the top wall portion (14) and bottom wall portion (16), roof portion (18), and support feet (20) are mounted and attached in sequence to construct the shelter (10) as described below.

i) Floor Portion

Figure 14:
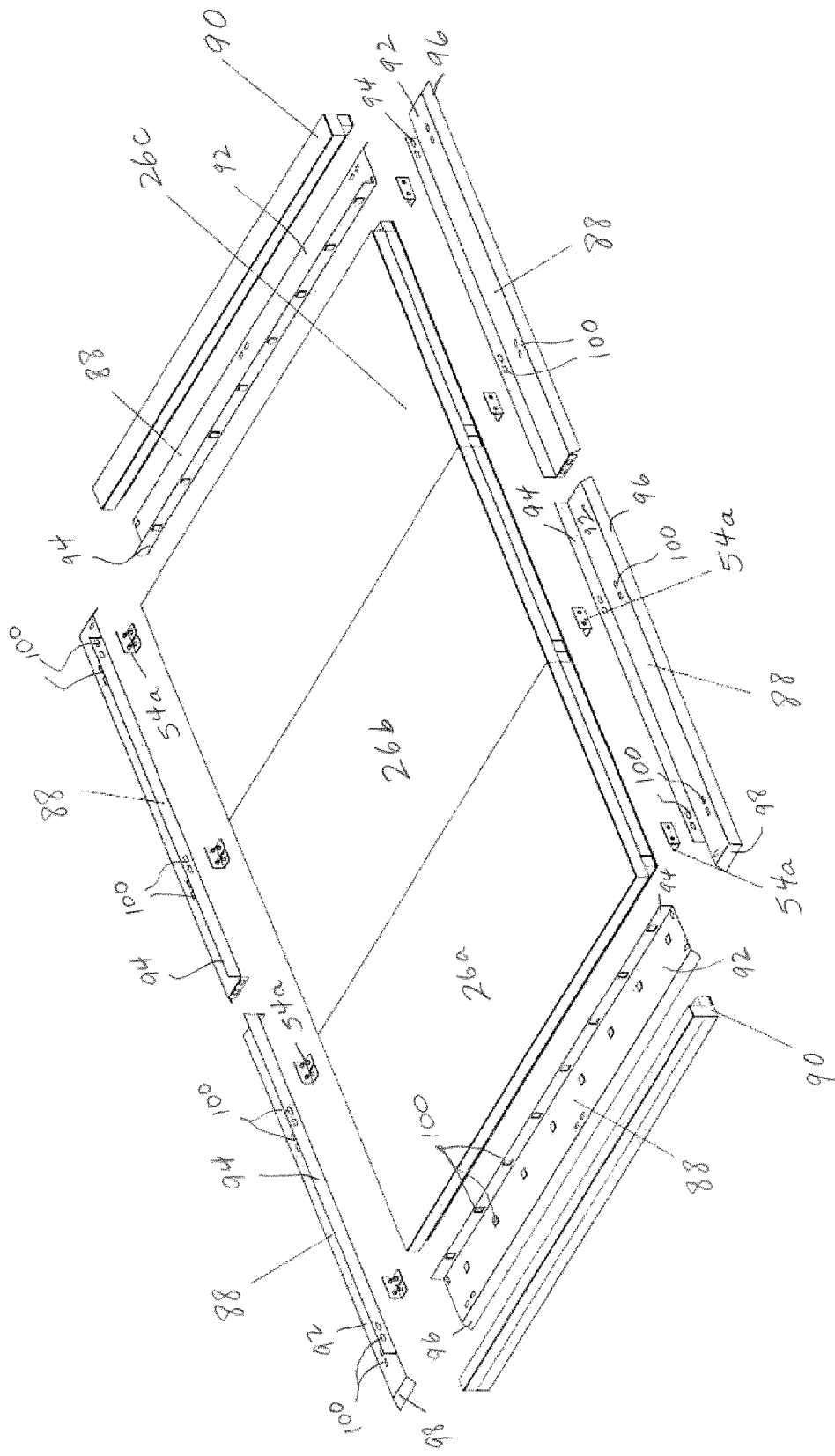
FIG. 14 is an exploded perspective view of one embodiment of a floor portion.

In one embodiment shown in FIGS. 14 and 19, the floor portion (12) of the shelter (10) comprises floor panels (26a, 26b, 26c), locking elements (54a), trim floor connections (88), and corner panels (90). In one embodiment, the floor portion (12) comprises at least two panels (26a, 26b) secured by locking elements (54a). In one embodiment, the floor portion (12) comprises three panels (26a, 26b, 26c) secured by locking members (54a).

The trim floor connection (88) is substantially "Z-shaped" when viewed in cross-section and comprises a base plate (92), opposed top (94) and bottom (96) flanges, and edge flanges (98). One or more of the base plate (92), top and bottom flanges (94, 96), and edge flanges (98) define one or more apertures (100) through which attachment means extend to connect the trim floor connection (88) to the panels (26a, 26b, 26c). In one embodiment, the apertures (100) are spaced and distributed evenly along the lengths of the base plate (92) and top flange (94) and in alignment with the locking members (54a). The corner panel (90) is substantially "L-shaped" in cross-section and comprises an elongate bracket configured to seat within the trim floor connection (88). In one embodiment, the corner panel (90) has a length substantially similar to the length of the trim floor connection (88). The trim floor connection (88) and corner panel (90) may be formed of galvanneal steel, or other appropriate materials known to those skilled in the art.

The trim floor connection (88) and the corner panels (90) reinforce and strengthen the floor panels (26a, 26b, 26c), and form a supportive base around the perimeter of the shelter (10) for connecting the bottom wall portion (16) to the floor portion (12).

ii) Support Feet

In particular environments, there may be a need to elevate the shelter (10) above ground: for example, above floodwater, mud, snow, uneven surface, etc. As used herein, the term "ground" may comprise natural earthen materials, gravel, concrete, asphalt, synthetics, composites or plastics. In one embodiment shown in FIGS. 1 and 19, support feet (20) elevate the floor portion (12) above the ground. Any number of support feet (20) may be used as required to ensure that the shelter (10) rests substantially horizontal or level above the ground. As used herein, the term "horizontal" means the orientation of a plane or line that is substantially parallel to the plane of the horizon. In one embodiment, the support feet (20) are arranged in two rows of four positioned at the edges and corners of the floor portion (12).

As shown in FIGS. 15A-15B, the support foot (20) comprises in sequence from top to bottom: a top plate (112) defining openings (114) for receiving nuts (116), a hollow structural section (118), a middle plate (120) supporting a nut (122), and a base plate (124) supporting a structural bolt and nut (126). In one embodiment, the top plate (112) is substantially square-shaped and larger in size than the middle and base plates (120, 124) to provide a greater surface area for supporting the shelter (10). In one embodiment, the base plate (124) is substantially circular for providing stability when placed on the ground. The support foot (20) may be formed of steel, for example, stainless steel, and strength-bearing materials.

The support foot (20) is attached to the floor portion (12) by connecting the nuts (116) of the top plate (112) to the undersurface of the floor portion (12). In one embodiment, the support foot (20) is attached to the undersurface of the trim floor connections (88) and corner panels (90). The height of the support foot (20) is adjustable using the nut (126) to ensure that the shelter (10) rests substantially horizontal or level above uneven portions of the ground.

iii) Wall Portions a) Bottom Wall Portion

The bottom wall portion (16) of the shelter (10) comprises front (26f, 26g, 26h), rear (26i, 26j, 26k), and side (26l, 26m) panels. In one embodiment shown in FIGS. 16 and 19, the front and rear panels (26f, 26g, 26h, 26i, 26j, 26k) are connected to the side panels (26l, 26m) by corner panels (26n, 26o, 26p, 26q). In one embodiment, the front of the shelter (10) comprises three interconnected panels (26f, 26g, 26h). In one embodiment, the sides of the shelter (10) comprise two panels (26l, 26m). In one embodiment, the front and rear panels (26f, 26g, 26h, 26i, 26j, 26k) are connected to the side panels (26l, 26m) by four corner panels (26n, 26o, 26p, 26q). The front panels (26f, 26h) may provide a passageway (12) or openings (14). These components are connected by doubled-armed and T-shaped locking elements (54a, 54c, 54e).

b) Top Wall Portion

In one embodiment shown in FIGS. 17 and 19, a top wall portion (14) is positioned between the bottom wall portion (16) and the roof portion (18) to slope the roof portion (18) of the shelter (10). As shown in FIG. 17, the top wall portion (14) comprises rectangular-shaped panels (26r), corner panels (26s), sloped rectangular-shaped gable panels (26t), and sloped triangular-shaped gable panels (82). These components are connected by single and double-armed locking elements (54c, 54d). The gable panels (26t, 82) together angle the roof portion (18) downwardly in order to direct water and snow on the roof portion (18) to the ground. In one embodiment, the roof portion (18) is angled in a direction towards the rear of the shelter (10) and away from the front of the shelter (10) to prevent water and snow falling over the passageway (12) through which a person may be entering or leaving the shelter (10).

iv) Roof Portion

In one embodiment shown in FIGS. 18 and 19, the roof portion (18) is positioned over the top wall portion (14) such that the roof portion (18) slopes downwardly to the ground. However, it will be appreciated by those skilled in the art that the roof portion (18) can be positioned directly over the bottom wall portion (16) in a shelter (10) that may lack a top wall portion (14) to yield a flat roof.

In one embodiment shown in FIG. 18, the roof portion (18) comprises a plurality of large and small rectangular-shaped roof panels (84, 86), front trim connections (74), edge trim connections (128), and rear trim connections (78). These components are connected by single and double-armed locking elements (54c, 54d, 54f). A mosaic of the large and small rectangular-shaped roof panels (84, 86) is used to confer strength and stability to the roof portion (18).

The front trim connection (74) is substantially "L-shaped" in cross-section and comprises an upper lipped portion (130), downwardly angled ledge (132), and lower lipped portion (134). The upper lipped portion (130) and lower lipped portion (134) define one or more apertures (136) through which attachment means extend to connect the front trim connection (74) to the front roof panels (84, 86). In one embodiment, the apertures (136) are spaced and distributed evenly along the lengths of the upper lipped portion (130) and lower lipped portion (134), and in alignment with the locking elements (54c, 54d). The front trim connection (74) has a length substantially similar to the length of the front roof panels (84, 86).

The edge trim connection (128) comprises an elongate bracket (138), base plate (140), and a bottom flange (142). The bracket (138) includes clip members (500) to interconnect with corresponding clip members (50) of the edge roof panels (84, 86). The base plate (140) defines one or more apertures (144) through which attachment means extend to connect the edge trim connection (128) to the edge roof panels (84, 86). The edge trim connection (128) has a length substantially similar to the length of the edge roof panels (84, 86).

The rear trim connection (78) is substantially "W-shaped" in cross-section and comprises a first side lipped portion (146), downwardly angled ledge (148), flat body portion (150), and a second side lipped portion (152). The first side lipped portion (146) and flat body portion (150) define one or more apertures (154) through which attachment means extend to connect the rear trim connection (78) to the rear roof panels (84, 86). In one embodiment, the apertures (154)

are spaced and distributed evenly along the lengths of the first side lipped portion (146) and flat body portion (150), and in alignment with the locking members (54c, 54d). The rear trim connection (78) has a length substantially similar to the length of the rear roof panels (84, 86).

The front trim connections (74), edge trim connections (128), and rear trim connections (78) may be formed of galvanneal steel, or other appropriate materials known to those skilled in the art. The front, edge, and rear trim connections (74, 128, 78) reinforce and strengthen the roof panels (84, 86), and connect the roof portion (18) to the top wall portion (14) or directly to the bottom wall portion (16) if the top wall portion (14) is omitted.

It should be apparent, however, to those skilled in the art that many more modifications besides those already described are possible without departing from the inventive concepts herein. The inventive subject matter, therefore, is not to be restricted except in the scope of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A shelter comprising:
   a floor portion;
   at least one wall portion comprising a top wall portion, a bottom wall portion, or both the top wall portion and the bottom wall portion; and
   a roof portion;
   wherein each of the floor portion, the at least one wall portion, and the roof portion comprises at least two panels detachably interconnected using a female bracket element and a male bracket element configured for receiving the at least two panels and comprising cooperating means actuated by longitudinal movement for preventing separation of the female bracket element and the male bracket element and interconnecting the at least two panels;
   wherein each of the at least two panels comprises a first planar layer and a second planar layer, and the first planar layer is offset from the second planar layer;
   wherein the female bracket element or the male bracket element is disposed on the first planar layer;
   wherein each of the female bracket element and the male bracket element comprises an upper portion and parallel opposed side walls defining a channel for receiving an elongate side edge of a respective panel therein;
   wherein the cooperating means comprises a plurality of pin members positioned to extend outwardly from the upper portion of the male bracket element and keyholes defined by the upper portion of the female bracket element; and
   wherein each of the plurality of pin members comprises a head and neck, and each of the keyholes comprises an enlarged portion configured to allow insertion of the head therethrough, and an adjacent reduced portion projecting from a bottom of the enlarged portion and configured to allow insertion of the neck to hold the pin member in the keyhole and prevent removal therefrom.

2. The shelter of claim 1, wherein the cooperating means comprises a plurality of clip members having recessed notches and defined by the upper portion of the female bracket element and the male bracket element.

3. The shelter of claim 2, wherein the clip members of the female bracket element comprise upwardly projecting tabs for engaging corresponding notches of the male bracket element; and the clip members of the male bracket element comprise downwardly projecting tabs for engaging corresponding notches of the female bracket element.

4. The shelter of claim 3, wherein the clip members are spaced apart and evenly distributed along an entire length of the female bracket element or the male bracket element or a portion thereof for interconnecting the panels along at least one or more elongate side edges in side-by-side abutment.

5. The shelter of claim 2, further comprising locking elements and attachment means fastened to one or both ends of the female bracket element and the male bracket element for preventing longitudinal displacement of the male bracket element in relation to the female bracket element.

6. The shelter of claim 5, further comprising planar boards defining bores for receiving fastening means for fastening the planar boards to the locking elements.

7. The shelter of claim 1, wherein the cooperating means comprises tabs and corresponding slots, the tabs being formed integral with a side wall of the male bracket element and extending from the edge of the side wall beyond the upper portion of the male bracket element, and the slots being defined by a longitudinal edge of the upper portion of the female bracket element.

8. The shelter of claim 7, wherein the tabs define notches for engaging the slots.

9. The shelter of claim 1, wherein the floor portion comprises a plurality of floor panels, locking elements, corner panels, and trim floor connections for connecting the bottom wall portion to the floor portion.

10. The shelter of claim 9, wherein the trim floor connection comprises a base plate, opposed top and bottom flanges, and edge flanges; one or more of the base plate, top and bottom flanges, and edge flanges defining apertures for receiving attachment means for connecting the trim floor connection to the floor panels.

11. The shelter of claim 10, further comprising adjustable support feet for elevating the shelter above ground.

12. The shelter of claim 1, wherein the bottom wall portion comprises a front panel, a rear panel, and side panels, the front panel and the rear panel being connected to the side panels by corner panels.

13. The shelter of claim 1, wherein the top wall portion is positioned between the bottom wall portion and the roof portion, and comprises rectangular-shaped panels, corner panels, and gable panels connected by locking elements.

14. The shelter of claim 1, wherein the roof portion is positioned over the top wall portion to slope downwardly to ground, and comprises roof panels, front trim connections, edge trim connections, and rear trim connections connected by locking elements; the front, edge, and rear trim connections connecting the roof portion to the top wall portion.

15. The shelter of claim 14, wherein the front trim connection comprises an upper lipped portion, downwardly angled ledge, and lower lipped portion; the upper lipped portion and lower lipped portion defining apertures for receiving attachment means for connecting the front trim connection to the front roof panels.

16. The shelter of claim 14, wherein the edge trim connection comprises an elongate bracket, a base plate, and a bottom flange; the elongate bracket and base plate defining apertures for receiving attachment means for connecting the first trim connection to the edge roof panels.

17. The shelter of claim 14, wherein the rear trim connection comprises a first side lipped portion, downwardly angled ledge, flat body portion, and a second side lipped portion, the first side lipped portion and flat body portion defining apertures for receiving attachment means for connecting the rear trim connection to the rear roof panels.

18. The shelter of claim 1, further comprising a passageway for allowing access to the shelter or accommodating a door therein.

19. The shelter of claim 1, further comprising an opening accommodating glazing, screening, or both glazing and screening for allowing passage of light.

* * * * *